(12) United States Patent
Hisamoto

(10) Patent No.: US 11,044,397 B2
(45) Date of Patent: Jun. 22, 2021

(54) IMAGE CAPTURING DEVICE AND IMAGE PROCESSING DEVICE, CONTROL METHODS OF THE SAME, AND STORAGE MEDIUM

(71) Applicant: CANON KABUSHIKI KAISHA, Tokyo (JP)

(72) Inventor: Shinji Hisamoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/539,040

(22) Filed: Aug. 13, 2019

(65) Prior Publication Data

US 2020/0059599 A1    Feb. 20, 2020

(30) Foreign Application Priority Data

Aug. 16, 2018   (JP) .............................. JP2018-153205
Sep. 7, 2018    (JP) .............................. JP2018-167870

(51) Int. Cl.
*H04N 7/00*      (2011.01)
*H04N 5/232*     (2006.01)
*H04N 5/235*     (2006.01)

(52) U.S. Cl.
CPC ....... *H04N 5/23238* (2013.01); *H04N 5/2353* (2013.01)

(58) Field of Classification Search
CPC ........... H04N 5/23209; H04N 5/23212; H04N 5/23229; H04N 5/23245; H04N 5/2356; H04N 5/238; H04N 5/3572; H04N 5/772; H04N 9/045; H04N 9/04515; H04N 9/04519; H04N 9/8042; H04N 9/8211;
(Continued)

(56) References Cited

U.S. PATENT DOCUMENTS

2005/0237631 A1    10/2005  Shioya
2017/0269187 A1*   9/2017   Ikeda ...................... G06T 7/248

FOREIGN PATENT DOCUMENTS

CN    104243795 A    12/2014
CN    105323425 A    2/2016
(Continued)

OTHER PUBLICATIONS

The above documents were cited in a Dec. 1, 2020 Chinese Office Action, that issued in Chinese Patent Application No. 201910743581.0.

*Primary Examiner* — Masum Billah
(74) *Attorney, Agent, or Firm* — Cowan, Liebowitz & Latman, P.C.

(57) ABSTRACT

An image capturing device includes image sensor, capturing a first image in a first image capturing region, capturing a second image in the first image capturing region at a shorter exposure time than that of the first image, after capturing the first image, capturing a third image in a second image capturing region at a shorter exposure time than that of the first image, after capturing the second image; and capturing a fourth image in the second image capturing region at a longer exposure time than those of the second and third images, after capturing the third image; and combining unit configured to carry out alignment processing between the images using the second image and the third image, and combine the first image and the fourth image on the basis of a result of the alignment processing.

19 Claims, 18 Drawing Sheets

(58) Field of Classification Search
CPC .. G06T 2207/20224; G06T 5/007; G06T 5/50
USPC .......................................................... 348/36
See application file for complete search history.

(56) References Cited

FOREIGN PATENT DOCUMENTS

| | | | |
|---|---|---|---|
| JP | 2005-328497 A | | 11/2005 |
| JP | 2005328497 A | * | 11/2005 |
| JP | 2016-005160 A | | 1/2016 |

* cited by examiner

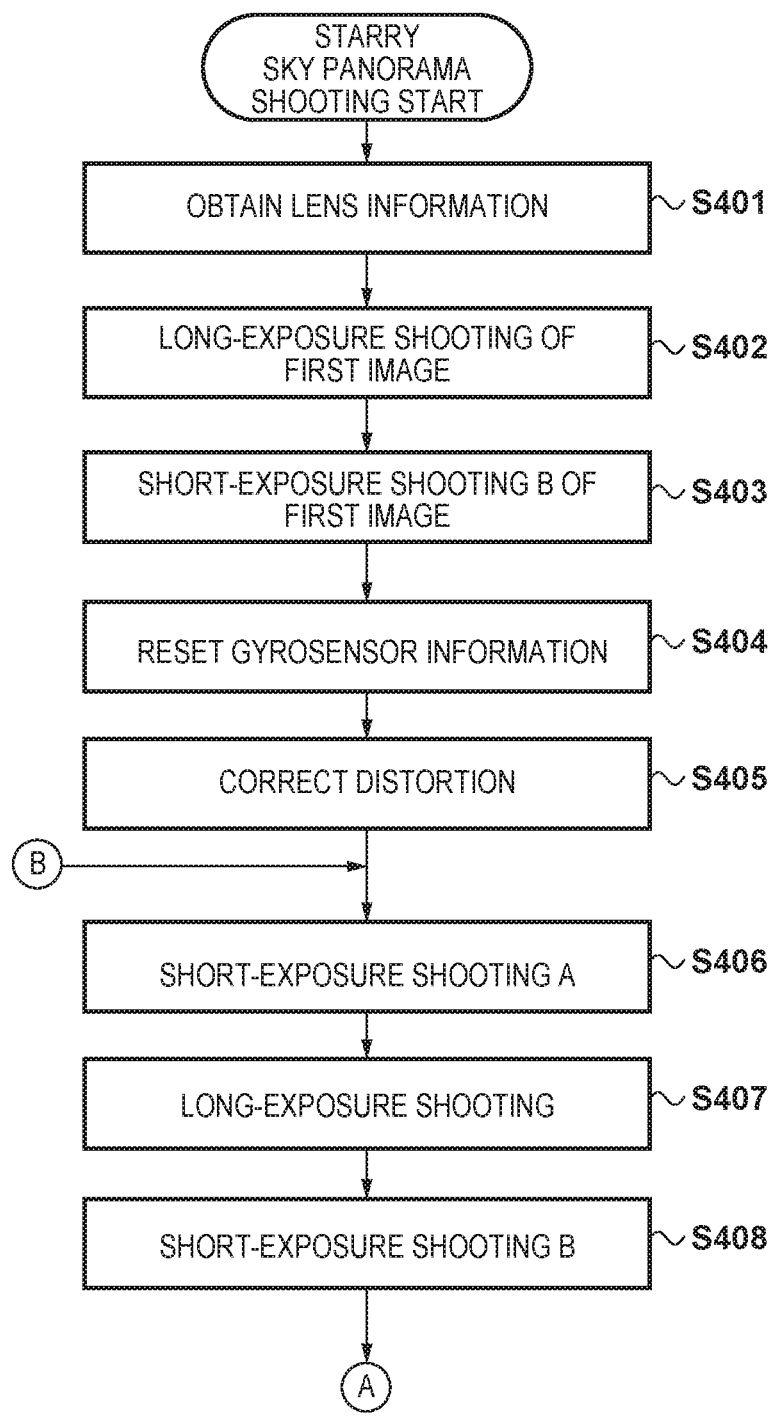

WARNING IMAGE FOR SHOOTING INTERVAL

WARNING IMAGE FOR SHOOTING ANGLE OF VIEW

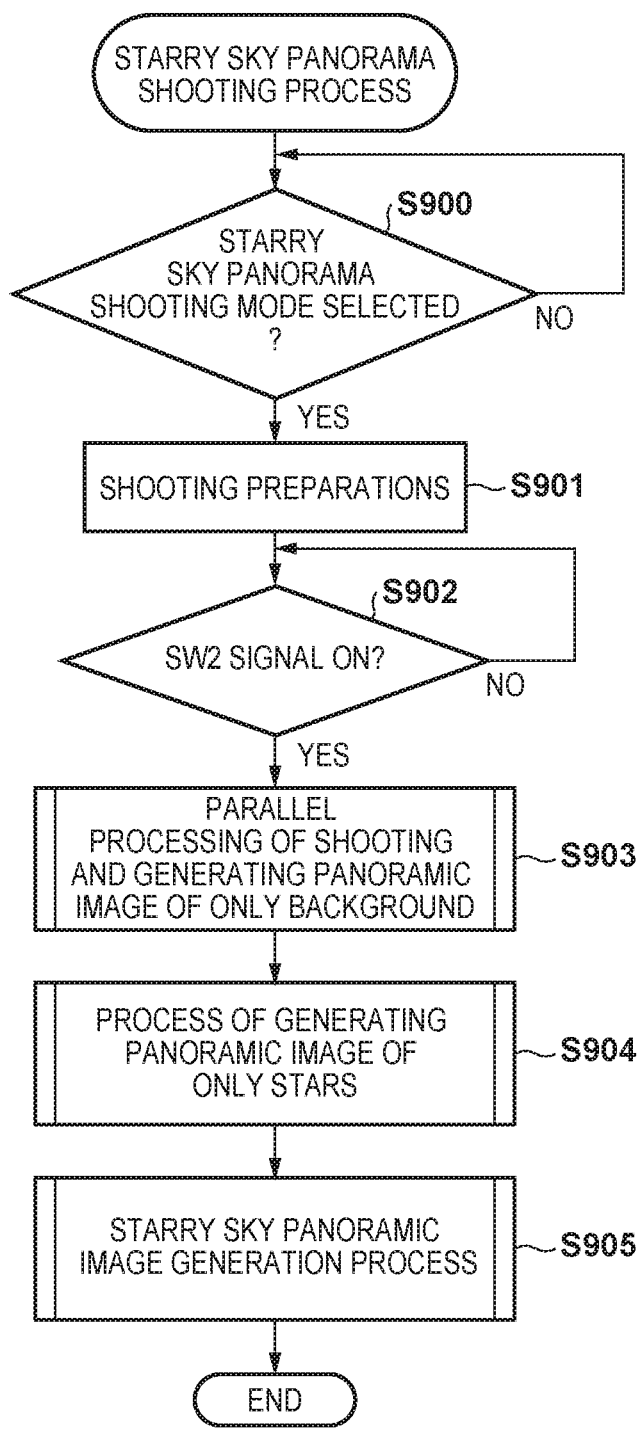

SCREEN WARNING THAT ALIGNMENT OF
IMAGES OF ONLY STARS HAS FAILED

IMAGE CAPTURING DEVICE AND IMAGE PROCESSING DEVICE, CONTROL METHODS OF THE SAME, AND STORAGE MEDIUM

BACKGROUND OF THE INVENTION

Field of the Invention

The present invention relates to a technique for obtaining a wider-range image of a starry sky, i.e., a panoramic starry sky image, by combining images captured continuously while successively changing the shooting direction so that regions which overlap with each other appear.

Description of the Related Art shooting is known as one shooting method for capturing a wide range of a starry sky in a single image. Japanese Patent Laid-Open No. 2005-328497 discloses the following shooting method as an example of such a method. A plurality of unit images, each of which constitutes a part of a range to be shot, are captured while successively changing the shooting direction. Image regions of a predetermined size are then cut out from the capturing unit images so that regions which overlap with each other are produced, and a panoramic image is then generated by superimposing the cut-out image regions in sequence.

Problems arising if this method is applied when shooting a panorama of a starry sky will be described next. When shooting a starry sky, there is only an extremely small amount of light from the stars, and thus long exposures, such as 30 seconds or 1 minute, are often used. Astronomical bodies exhibit diurnal motion in accordance with the earth's rotation, and thus stars exposed for a long time will appear not as points of light, but rather as tracks of light.

When shooting a panorama of a starry sky, it is necessary to generate the panoramic image by shooting images at different shooting directions, at exposure times that are short enough to avoid making the stars appear as tracks of light, and then stitch the images together. There are also situations where one wishes to shoot a long-exposure panorama of a starry sky. The stars move over time, and will thus be in different positions from image to image, which makes it difficult to successfully position the images with respect to each other. FIGS. 8A-8C illustrate an example in which, when shooting a panorama of a starry sky, positioning fails when combining two images shot from different directions. FIG. 8A illustrates the first shot image, where 801 indicates the background. FIG. 8B illustrates the second shot image, where 802 indicates the background. With the passage of an amount of time equivalent to a combination of the time of the long exposure shooting of the first image and time taken by the user to set the image capturing device to change the shooting direction, the stars are in a different position in the second image compared to the first image. FIG. 8C illustrates a state in which the first and second shot images have been positioned using the stars as a reference, resulting in the backgrounds 801 and 802 being combined having been shifted from each other by an amount equivalent to the stars' movement.

On the other hand, Japanese Patent Laid-Open No. 2016-005160 discloses a technique in which optical shake correction means are used to correct positional skew in the image capturing plane, caused by the diurnal motion of the astronomical bodies. Images are repeatedly shot and combined to obtain a shot image with a wider angle of view, while at the same time ensuring that the positioning succeeds.

However, the conventional technique disclosed in Japanese Patent Laid-Open No. 2016-005160 uses optical shake correction means, and there is thus a problem in that the maximum value of the change in shooting direction is limited. This means that it is not possible to capture an image of an astronomical body having an even wider angle of view.

SUMMARY OF THE INVENTION

Having been achieved in light of the above-described problem, the present invention provides an image capturing device capable of capturing a high-quality panoramic image even when the position of a star, which serves as a subject, has changed between images shot from different directions.

According to a first aspect of the present invention, there is provided an image capturing device capable of generating a single combined image by combining a plurality of images, each image being from a different image capturing region, and each image having a region at least partially shared by another image capturing region, the device comprising: an image sensor configured to capture a subject image, the image sensor: capturing a first image in a first image capturing region; capturing a second image in the first image capturing region at a shorter exposure time than that of the first image, after capturing the first image; capturing a third image in a second image capturing region at a shorter exposure time than that of the first image, after capturing the second image; and capturing a fourth image in the second image capturing region at a longer exposure time than those of the second and third images, after capturing the third image; and the device further comprising: at least one processor or circuit configured to function as the following unit: a combining unit configured to carry out alignment processing between the images using the second image and the third image, and combine the first image and the fourth image on the basis of a result of the alignment processing.

According to a second aspect of the present invention, there is provided an image processing device capable of generating a single combined image by combining a plurality of images, each image being from a different image capturing region, and each image having a region at least partially shared by another image capturing region, the device comprising: at least one processor or circuit configured to function as the following units: an obtainment unit configured to obtain a first image captured in a first image capturing region, a second image captured in the first image capturing region at a shorter exposure time than that of the first image after the first image has been captured, a third image captured in a second image capturing region at a shorter exposure time than that of the first image after the second image has been captured, and a fourth image captured in the second image capturing region at a longer exposure time than those of the second and third images after the third image has been captured, the images being captured by image sensor; and a combining unit configured to carry out alignment processing between the images using the second image and the third image, and combine the first image and the fourth image on the basis of a result of the alignment processing.

According to a third aspect of the present invention, there is provided a method of controlling an image capturing device capable of generating a single combined image by combining a plurality of images, each image being from a different image capturing region, and each image having a region at least partially shared by another image capturing region, the method comprising: capturing a first image in a first image capturing region; capturing a second image in the first image capturing region at a shorter exposure time than that of the first image, after capturing the first image; capturing a third image in a second image capturing region at a shorter exposure time than that of the first image, after capturing the second image; capturing a fourth image in the second image capturing region at a longer exposure time than those of the second and third images, after capturing the third image; and carrying out alignment processing between the images using the second image and the third image, and combining the first image and the fourth image on the basis of a result of the alignment processing.

According to a fourth aspect of the present invention, there is provided a method of controlling an image processing device capable of generating a single combined image by combining a plurality of images, each image being from a different image capturing region, and each image having a region at least partially shared by another image capturing region, the method comprising: obtaining a first image captured in a first image capturing region, a second image captured in the first image capturing region at a shorter exposure time than that of the first image after the first image has been captured, a third image captured in a second image capturing region at a shorter exposure time than that of the first image after the second image has been captured, and a fourth image captured in the second image capturing region at a longer exposure time than those of the second and third images after the third image has been captured, the images being captured by image sensor; and carrying out alignment processing between the images using the second image and the third image, and combining the first image and the fourth image on the basis of a result of the alignment processing.

According to a fifth aspect of the present invention, there is provided a non-transitory computer-readable storage medium storing a program for causing a computer to execute the steps of a method of controlling an image capturing device capable of generating a single combined image by combining a plurality of images, each image being from a different image capturing region, and each image having a region at least partially shared by another image capturing region, the method comprising: capturing a first image in a first image capturing region; capturing a second image in the first image capturing region at a shorter exposure time than that of the first image, after capturing the first image; capturing a third image in a second image capturing region at a shorter exposure time than that of the first image, after capturing the second image; capturing a fourth image in the second image capturing region at a longer exposure time than those of the second and third images, after capturing the third image; and carrying out alignment processing between the images using the second image and the third image, and combining the first image and the fourth image on the basis of a result of the alignment processing.

According to a sixth aspect of the present invention, there is provided a non-transitory computer-readable storage medium storing a program for causing a computer to execute the steps of a method of controlling an image processing device capable of generating a single combined image by combining a plurality of images, each image being from a different image capturing region, and each image having a region at least partially shared by another image capturing region, the method comprising: obtaining a first image captured in a first image capturing region, a second image captured in the first image capturing region at a shorter exposure time than that of the first image after the first image has been captured, a third image captured in a second image capturing region at a shorter exposure time than that of the first image after the second image has been captured, and a fourth image captured in the second image capturing region at a longer exposure time than those of the second and third images after the third image has been captured, the images being captured by image sensor; and carrying out alignment processing between the images using the second image and the third image, and combining the first image and the fourth image on the basis of a result of the alignment processing.

Further features of the present invention will become apparent from the following description of exemplary embodiments with reference to the attached drawings.

BRIEF DESCRIPTION OF THE DRAWINGS

FIGS. 4A and 4B are flowcharts illustrating operations for shooting a panorama of a starry sky, according to the first embodiment.

FIG. 9 is a flowchart illustrating operations for shooting a panorama of a starry sky, according to a fourth embodiment.

DESCRIPTION OF THE EMBODIMENTS

Hereinafter, embodiments of the present invention will be described in detail with reference to the appended drawings.

First Embodiment

Figure 2A:
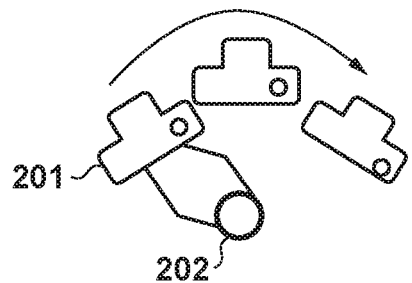
FIGS. 2A and 2B are conceptual diagrams illustrating a panoramic combination of a plurality of shot images.
Figure 2B:
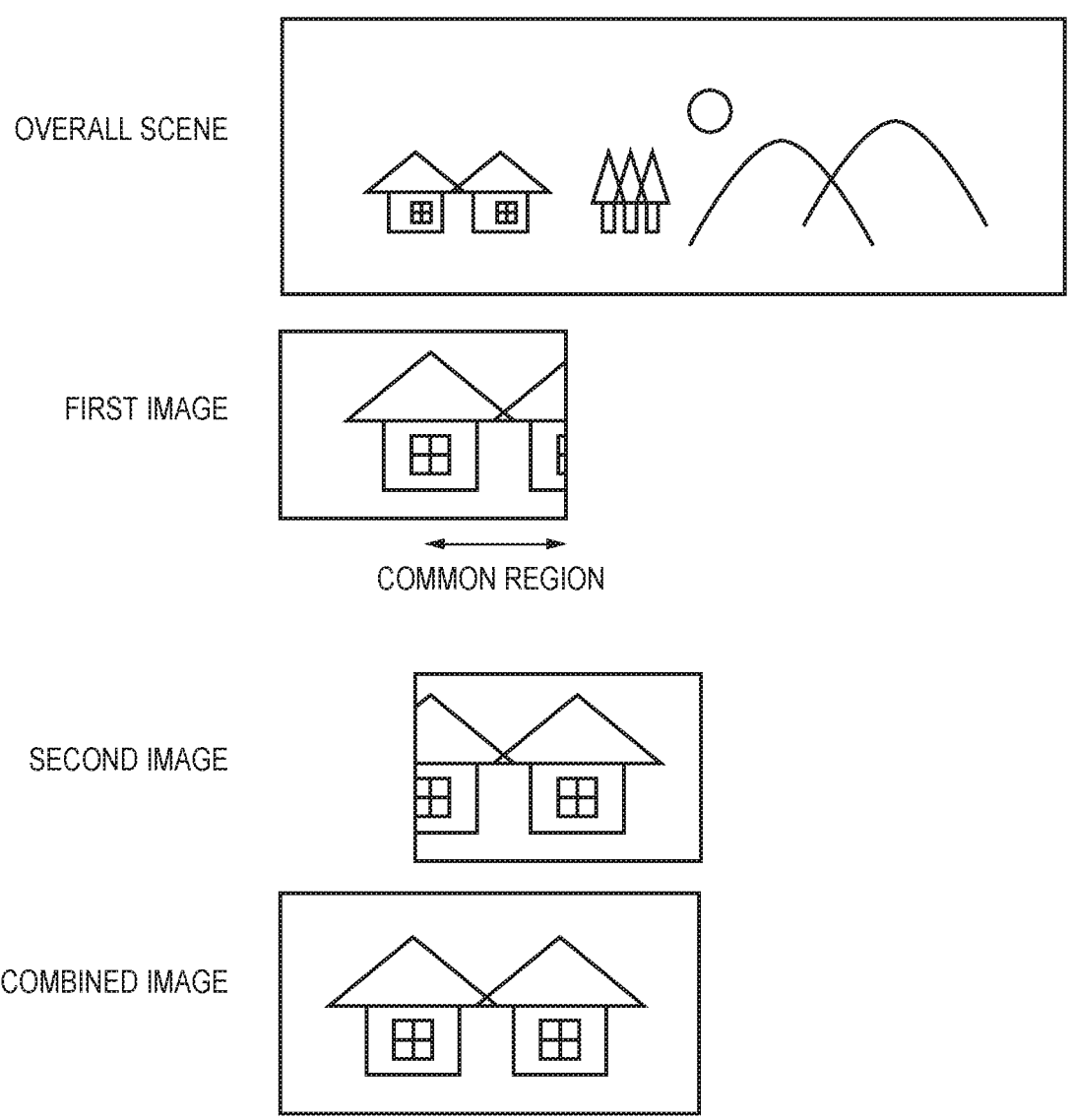

FIGS. 2A and 2B are diagrams illustrating an overview of panoramic shooting. In the present embodiment, panoramic shooting is realized by shooting while continuously changing the capturing direction of an image capturing device 201, which is done manually by a user 202 or by an automatic tracking mount or the like, as illustrated in FIG. 2A. As illustrated in FIG. 2B, a plurality of images are shot so that common regions of a subject are present in parts of each of the shot images. Feature points are then extracted from the common regions of the images, and a motion vector indicating the extent to which those feature points have moved is detected. An affine transformation coefficient, for example, is then calculated from the motion vector, and the two images are then superimposed so that the feature points coincide. This produces an image in which parts aside from the common regions have been extended. Repeating these multiple times makes it possible to generate a panoramic image having a wider angle of view than the angle of view achieved when shooting a single image.

Figure 1:
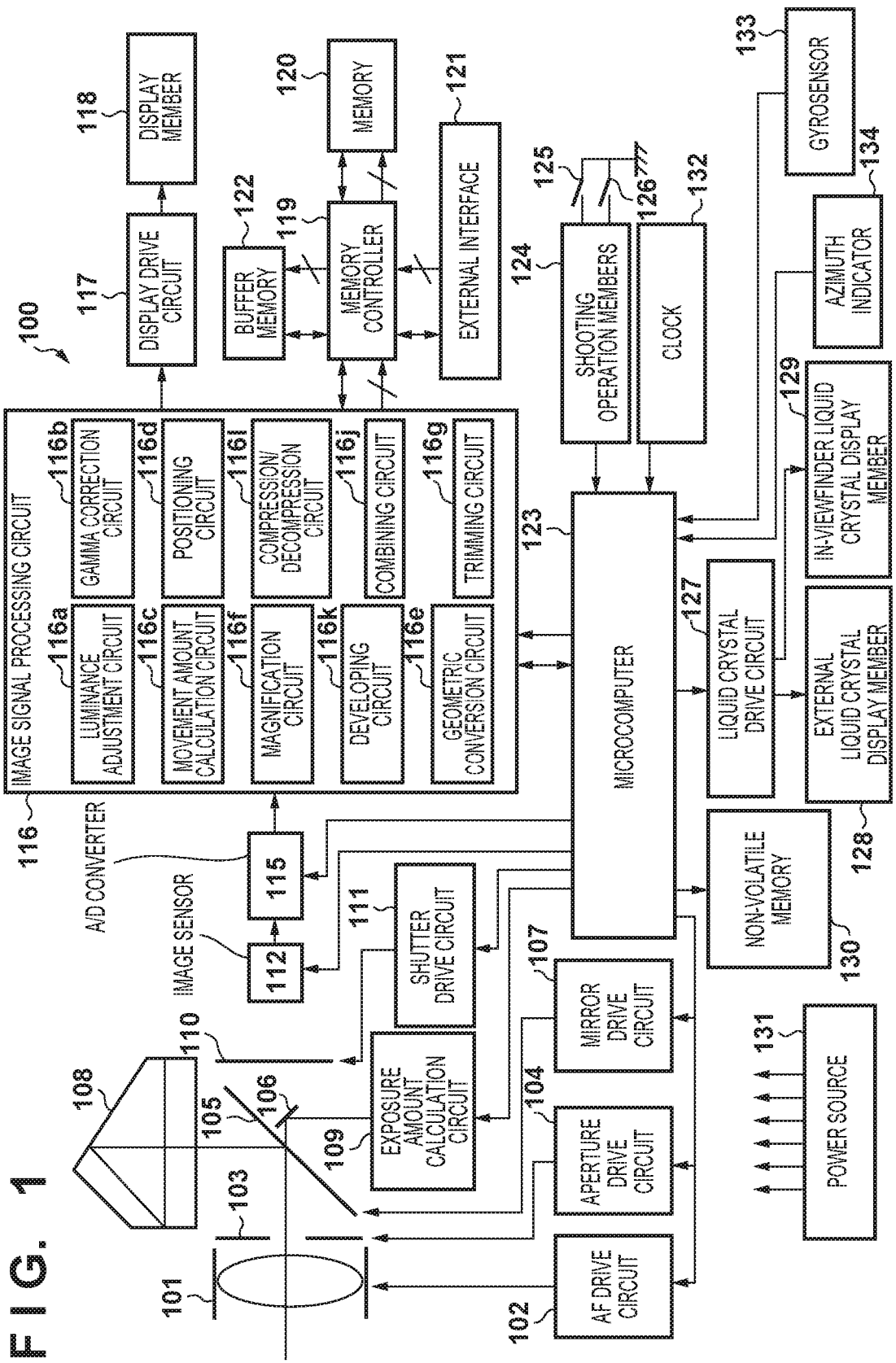
FIG. 1 is a block diagram illustrating the configuration of a first embodiment of an image capturing device according to the present invention.

FIG. 1 is a block diagram illustrating the configuration of a first embodiment of an image capturing device according to the present invention. In FIG. 1, an image capturing device 100 includes a shooting lens 101, which forms a subject image, and an autofocus (AF) drive circuit 102, which adjusts the focus of the shooting lens 101. The AF drive circuit 102 is constituted by a DC motor, a stepping motor, or the like, for example, and adjusts the focus by changing the position of a focus lens in the shooting lens 101 under the control of a microcomputer 123.

The shooting lens 101 includes an aperture stop 103, and the aperture stop 103 is driven by an aperture drive circuit 104. An optical aperture value is calculated by the microcomputer 123, and the amount by which the aperture drive circuit 104 drives the aperture stop 103 is determined on the basis of that value.

A main mirror 105 is arranged behind the aperture stop 103. The main mirror 105 switches between a state in which a light beam passing through the shooting lens 101 is guided to a viewfinder or to an image sensor 112. The main mirror 105 is normally arranged in a position that reflects the light beam upward so that the light beam is guided to the viewfinder, but flips upward, out from the optical path, when shooting or executing a live view display, so that the light beam is guided to the image sensor 112. Note that the main mirror 105 is a half mirror, the central part of which allows a small amount of light to pass. Some light is therefore allowed to pass and is guided to a focus detection sensor (not shown) for the purpose of focus detection. A defocus amount of the shooting lens 101 is found by computing the output of this focus detection sensor. The microcomputer 123 evaluates the computation result and instructs the AF drive circuit 102 to drive the focus lens.

The main mirror 105 is driven upward and downward by a mirror drive circuit 107, in response to instructions from the microcomputer 123. A sub mirror 106 is arranged behind the main mirror, and reflects the light beam passing through the main mirror 105 so as to guide that light beam to the aforementioned focus detection sensor. The light beam that has passed through the central part of the main mirror 105 and been reflected by the sub mirror 106 is also incident on an exposure amount calculation circuit 109, and reaches a photometry sensor for the purpose of photoelectric conversion, which is disposed within the exposure amount calculation circuit 109.

A pentaprism, which partially constitutes the viewfinder, is arranged above the main mirror 105. The viewfinder is also constituted by a focusing plate, an eyepiece lens (not shown), and the like.

A focal plane shutter 110, which opens and closes the optical path of the shooting lens 101, is driven by a shutter drive circuit 111. The time for which the focal plane shutter 110 is open is controlled by the microcomputer 123.

The image sensor 112 is arranged behind the focal plane shutter 110. A CCD, a CMOS sensor, or the like is used for the image sensor 112, and converts the subject image formed by the shooting lens 101 into an electrical signal. The output from the image sensor 112 is input to an A/D converter 115. The A/D converter 115 converts analog output signals from the image sensor 112 into digital signals.

An image signal processing circuit 116 is realized by a logic device such as a gate array. The image signal processing circuit 116 includes a luminance adjustment circuit 116a, a gamma correction circuit 116b, a movement amount calculation circuit 116c, a positioning circuit 116d, a geometric conversion circuit 116e, and a magnification circuit 116f. The image signal processing circuit 116 further includes a trimming circuit 116e, a combining circuit 116j, a developing circuit 116k, and a compression/decompression circuit 116l.

The luminance adjustment circuit 116a adjusts the brightness using digital gain. The gamma correction circuit 116b adjusts the luminance using gamma characteristics. The movement amount calculation circuit 116c calculates a movement amount in a plurality of images. The positioning circuit 116d positions the plurality of images in accordance with the movement amount in the images. The geometric conversion circuit 116e corrects for the curvature of the shooting lens 101. The magnification circuit 116f changes the size of the images. The trimming circuit 116e cuts out parts of the images. The combining circuit 116j combines the plurality of images. The developing circuit 116k develops the image data. The compression/decompression circuit 116l converts the image data into a typical image format such as JPEG.

A display drive circuit 117, a display member 118 that uses TFTs, organic EL, or the like, a memory controller 119, memory 120, an external interface 121 for connectivity with a computer or the like, and buffer memory 122 are connected to the image signal processing circuit 116.

The image signal processing circuit 116 carries out filtering, color conversion, and gamma processing, as well as compression processing according to the JPEG format, on the digitized image data, and outputs the result to the memory controller 119. At this time, the image being processed can also be stored in the buffer memory 122 temporarily.

The image signal processing circuit 116 can also output image signals from the image sensor 112, image data that conversely has been input from the memory controller 119, and the like to the display member 118 through the display drive circuit 117. These functions are switched in response to instructions from the microcomputer 123.

The image signal processing circuit 116 can also output information, such as exposure or white balance information of the signal from the image sensor 112, to the microcomputer 123 as necessary. The microcomputer 123 makes instructions pertaining to white balance adjustment, gain adjustment, and the like on the basis of that information.

In continuous shooting operations, shot data is first stored in the buffer memory 122 in an unprocessed state. The unprocessed image data is then read out through the memory controller 119 and subjected to image processing, compression processing, and the like by the image signal processing circuit 116 to carry out the continuous shooting. The number of continuous shots depends on the capacity of the buffer memory 122 or, when shooting a panorama, the image size. The memory controller 119 stores the unprocessed digital image data input from the image signal processing circuit 116 in the buffer memory 122, and stores the processed digital image data in the memory 120. It is also possible to conversely output image data from the buffer memory 122, the memory 120, or the like to the image signal processing circuit 116. There are also cases where the memory 120 can be removed. Note that the memory controller 119 can also output images stored in the memory 120 to the exterior through the external interface 121, which enables a computer or the like to be connected.

Operation members 124 communicate their state to the microcomputer 123, and the microcomputer 123 controls the respective constituent elements in accordance with changes in the operation members. A switch SW1 (125) and a switch SW2 (126) are switches that turn on and off when a release button is operated, and each is one input switch in the operation members 124.

A state where only the switch SW1 (125) is on corresponds to a state where the release button is depressed halfway. Autofocus operations and photometry operations are carried out in this state. A state in which both the switches SW1 (125) and SW2 (126) are on corresponds to a state where the release button is fully depressed. This is a state where a release switch for recording an image is on. Shooting is carried out in this state. Continuous shooting operations are carried out while the switches SW1 (125) and SW2 (126) remain on.

The following switches, which are not shown, are also connected to the operation members 124: an ISO setting button; a menu button; a set button; a flash settings button; a single shot/continuous shooting/self-timer switching button; a movement + (plus) button and a movement − (minus) button for moving through menus and images to be played back; an exposure correction button; a displayed image enlarge button; a displayed image reduce button; a playback switch; an aperture button for bringing the aperture stop 103 to the set aperture value; a delete button for deleting shot images; information display buttons pertaining to shooting, playback, and the like; and so on. The states of these switches are detected. Assigning the functions of the aforementioned plus button and minus button to a rotary dial switch makes it possible to select numerical values, functions, and the like more easily.

A liquid crystal drive circuit 127 causes operational states, messages, and the like to be displayed in an external liquid crystal display member 128, an in-viewfinder liquid crystal display member 129, and the like using text and images, in response to display commands from the microcomputer 123. A backlight (not shown), which uses LEDs or the like, is provided in the in-viewfinder liquid crystal display member 129, and the LEDs are also driven by the liquid crystal drive circuit 127.

The microcomputer 123 can calculate the remaining number of shots that can be taken, having confirmed the memory capacity through the memory controller 119, on the basis of predictive value data for the image size according to the ISO sensitivity, image size, and image quality set before shooting. This information can also be displayed in the external liquid crystal display member 128 and the in-viewfinder liquid crystal display member 129 as necessary.

Non-volatile memory (EEPROM) 130 can store data even when the camera is not turned on. A power source unit 131 supplies the necessary power to the various ICs, drive systems, and the like. An internal clock 132 measures the passage of time, and can save shooting times and the like in image files recorded into the memory 120, superimpose the shooting time on images themselves (as will be described later), and so on. A gyrosensor 133 detects the angular velocity of rotation of the image capturing device 100 on two or three axes. An azimuth indicator 134 detects the direction in which the image capturing device is facing.

Figure 3:
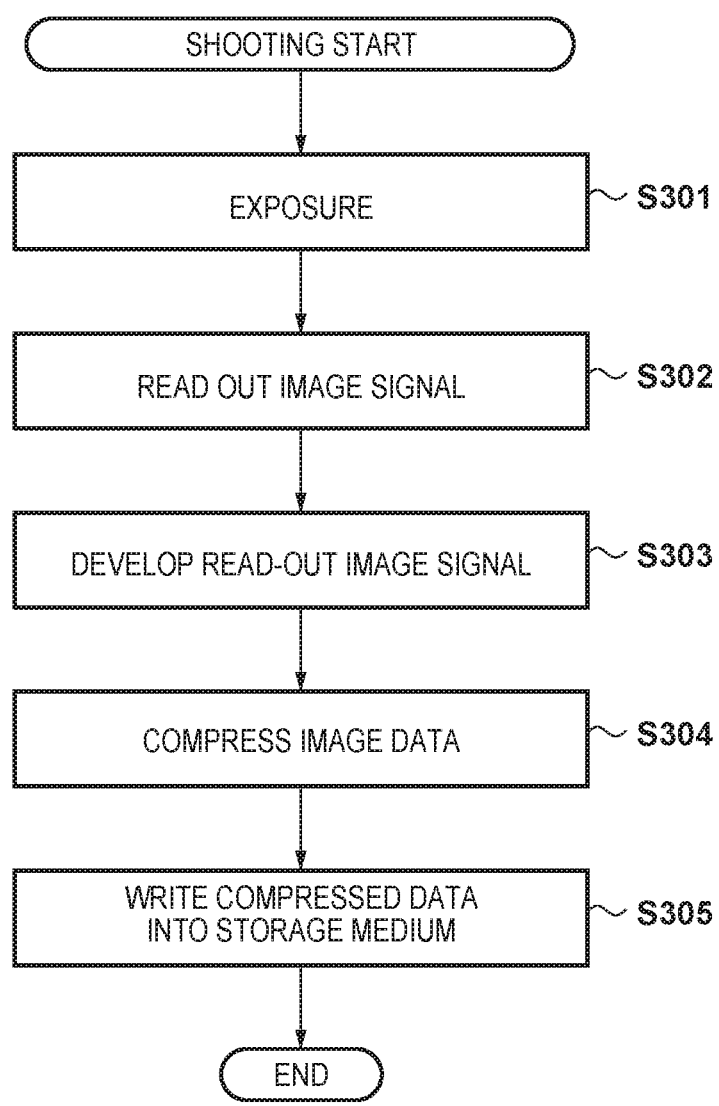
FIG. 3 is a flowchart illustrating normal shooting operations.

Operations of the image capturing device configured as described above will be described next. FIG. 3 is a flowchart illustrating shooting operations by the image capturing device according to the first embodiment.

First, before starting the shooting operations, the exposure amount calculation circuit 109 calculates the exposure amount, and the aperture value, accumulation time, and ISO sensitivity are set. The shooting operations are carried out upon the switch SW2 (126) being depressed by the user.

In step S301, the microcomputer 123 notifies the aperture drive circuit 104 of the predetermined aperture value, and the aperture stop 103 is adjusted to the target aperture value. Power is supplied to the image sensor 112, the A/D converter 115, and the like to prepare for shooting. Once the preparations are complete, the mirror drive circuit 107 is driven to flip the main mirror 105 up, so that the subject image is incident on the image sensor 112. A shutter drive circuit opens a front curtain (not shown) of the focal plane shutter 110 so that the subject image is incident on the image sensor 112. Then, after a predetermined accumulation time, a rear curtain (not shown) of the shutter 110 is closed so that light enters the image sensor 112 only for the accumulation time. Exposure is carried out through this sequence of operations.

In step S302, an image signal is read out to the image signal processing circuit 116 through the A/D converter 115 and stored in the buffer memory 122. In step S303, the read-out image signal is developed by the developing circuit 116*k* and converted into image data. At this time, image processing such as white balance processing, gamma processing carried out by the gamma correction circuit 116*b* to apply gain to dark parts, and the like may be used to bring to the image to an appropriate image quality.

In step S304, the obtained image data is converted into a generic data format, such as JPEG, by the compression/decompression circuit 116*l*. In step S305, the converted image data is saved into the memory 120, which is an SD card or Compact Flash (registered trademark). This ends the shooting operations.

Note that in step S303, rather than carrying out the image processing, developing processing, and so on, the read-out image signal may be losslessly compressed directly in step S304, and may then be saved in a storage medium in step S305. The switch can be made by the user, using the operation members 124.

A starry sky panorama shooting mode will be described next. Although a starry sky panorama can be shot in a mode that shoots images while shifting the image capturing device in the horizontal direction or a mode that shoots images while shifting the image capturing device in the vertical direction, an example of shooting while shifting in the horizontal direction will be described here.

When the user uses the operation members 124 to set the starry sky panorama shooting mode, power is supplied to the image sensor 112 and the A/D converter 115 to make initial settings. Meanwhile, the main mirror 105 flips up, the shutter drive circuit 111 opens the shutter 110, and the subject image is incident on the image sensor 112 through the shooting lens 101.

The signal from the image sensor 112 is converted to a digital signal by the A/D converter 115, developed by the developing circuit 116*k* of the image signal processing circuit 116, and converted into a suitable image by the luminance adjustment circuit 116*a* and the gamma correction circuit 116b. This image data is then converted by the magnification circuit 116f to an image size suited to the display member 118, and is then displayed. What is known as a "live view display" is achieved by repeating this process 24 to 60 times per second.

The user adjusts the shooting direction, angle of view, and the like while confirming the live view display, and presses the switch SW1 (125). The exposure amount is calculated upon the switch SW1 (125) being pressed. If live view shooting is not being used, the light reflected by the sub mirror 106 is received by the exposure amount calculation circuit 109, which then calculates an appropriate exposure amount. If live view shooting is being used, the appropriate exposure amount is determined by an exposure amount calculation circuit (not shown) included in the image signal processing circuit 116. Then, the microcomputer 123 drives the aperture stop 103 using the aperture drive circuit 104, controls the sensitivity, accumulation time, and the like of the image sensor 112, and so on. A program chart for ensuring an exposure time at which stars will not appear as lines is used when shooting a starry sky panorama. On the other hand, the AF drive circuit 102 drives the shooting lens 101 to adjust the focus. Once the shooting preparations have ended, the user is notified using a buzzer or the like (not shown). The user then points the image capturing device in the direction he/she wishes to start shooting from, and presses the switch SW2 (126), whereupon the shooting of a starry sky panorama is started.

The shooting of a starry sky panorama will be described in further detail next using the flowcharts in FIGS. 4A and 4B and the data flow diagrams in FIGS. 5A and 5B.

When the shooting of a starry sky panorama is started, first, the microcomputer 123 acquires lens information in step S401. This lens information includes data for correcting distortion, a drop in the amount of light in the peripheral parts of the lens, and the like (described later).

In step S402, long-exposure shooting is carried out for the first image. The image sensor 112 and the A/D converter 115 are set for live view driving, and thus the driving is switched to driving for shooting a still image. The aperture stop 103 is adjusted to the exposure amount determined earlier, and the focal plane shutter 110 is opened and closed to expose the image sensor 112. The image signal obtained by the image sensor 112 is converted to a digital signal by the A/D converter 115 and stored in the buffer memory 122. This image data is subjected to processing such as shading correction by a circuit (not shown) included in the image signal processing circuit 116. Image data that has undergone the minimum amount of processing in this manner is called RAW image data 501. This RAW image data 501 is developed by the developing circuit 116k to obtain YUV image data 502.

Next, in step S403, high-sensitivity short-exposure shooting is carried out for the first image to obtain a short-exposure image. High-sensitivity short-exposure shooting carried out immediately before the long-exposure shooting will be referred to as A, and high-sensitivity short-exposure shooting carried out immediately after the long-exposure shooting will be referred to as B. The high-sensitivity short-exposure shooting is used only to calculate a movement amount, and is not used to obtain images for panoramic combination. The high-sensitivity short-exposure shooting B is carried out in step S403. The stars will be small and faint in short-exposure shooting, and thus the shooting is carried out at a higher ISO sensitivity. As with the long-exposure shooting, RAW image data 504 is developed by the developing circuit 116k to obtain YUV image data 505.

In step S404, the gyrosensor 133 is first reset at the point in time of the first image, to make it possible to later obtain the extent to which the image capturing device 100 has swung (pivoted) leading up to the shooting of the second image, in step S409.

In step S405, the geometric conversion circuit 116e corrects the developed image data 502 and 505 from the long-exposure shooting and the short-exposure shooting, respectively, for distortion produced by the shooting lens 101, using a known technique, to obtain distortion-corrected image data 503 and 506. The long-exposure distortion-corrected image data 503 is reduced by the magnification circuit 116f in accordance with the number of pixels in the liquid crystal monitor to display the data in the display member 118, and is then stored in VRAM 511.

Next, in step S406, the high-sensitivity short-exposure shooting A for the second image is carried out to obtain image data 508. In step S407, long-exposure shooting is carried out for the second image to obtain image data 513. Furthermore, in step S408, the high-sensitivity short-exposure shooting B is carried out for the second image to obtain image data 516. As in step S402, the RAW image data 508, 513, and 516 is developed by the developing circuit 116k to obtain YUV image data 509, 514, and 517.

In step S409, gyrosensor information, which is a detection value from the gyrosensor 133, is obtained in order to obtain the amount by which the image capturing device 100 has swung since the previous shooting. Although values in two axial directions of the image capturing device, namely the yaw direction and the pitch direction, are obtained as the gyrosensor information, it is preferable that values be obtained for a third axial direction, namely the roll direction corresponding to rotation about the optical axis, as well. Although the outputs from the gyrosensor 133 are themselves angular velocities, panoramic shooting requires the extent to which the apparatus has swung since the previous shooting. Thus the angular velocities from the previous shooting to the next shooting are integrated, and a rotation angle 507 from the previous shooting is calculated and stored for the second and subsequent images.

In step S410, the rotation angle 507 is converted into pixel units on the basis of the focal length and angle of view of the lens obtained in step S401, information of the image sensor, and so on.

Assuming an effective focal length of f [mm] and an image sensor width of w [mm], the angle of view (a) of a typical lens having no distortion or the distortion-corrected angle of view (a) is calculated through the following Formula 1.

$$\alpha[°]=2\times \arctan(w[mm]\div 2\div f[mm])\qquad \text{(Formula 1)}$$

Assuming the size of the image sensor per pixel is p [μm] and the swing angle [°] is 0, a movement amount d [pix] in the image is calculated through Formula 2.

$$d[pix]=\tan(\alpha[°]\div 2)\times f[mm]/p[\mu m]\times 1000\qquad \text{(Formula 2)}$$

In step S411, the data for the second image is subjected to distortion correction in the same manner as the distortion correction for the first images (step S405), to obtain distortion-corrected image data 510, 515, and 518. As with the first image, the distortion-corrected long-exposure shooting image data 515 is reduced by the magnification circuit 116f in accordance with the number of pixels in the liquid crystal monitor to display the data in the display member 118, and is then stored in VRAM 519.

In step S412, the movement amount calculation circuit 116c is used to calculate a movement amount from the image data 506 obtained from the high-sensitivity short-exposure shooting B for the first image and the image data 510 obtained from the high-sensitivity short-exposure shooting A for the second image. A known method can be used to detect the movement amount, as described above. However, in the present embodiment, the movement amount detection circuit 116c finds and samples several feature points within the image to calculate an affine coefficient 512.

Specifically, edges are detected, feature points are extracted, and the movement amount is calculated. Here, assume that feature point 1 has moved from coordinates (x1,y1) to coordinates (u1,v1), feature point 2 has moved from coordinates (x2,y2) to coordinates (u2,v2), and feature point 3 has moved from coordinates (x3,y3) to coordinates (u3,v3), for example. In this case, Formulas 3 and 4 are obtained by creating simultaneous equations from Formula 1.

$$\begin{pmatrix} x1 & y1 & 1 \\ x2 & y2 & 1 \\ x3 & y3 & 1 \end{pmatrix} \begin{pmatrix} a \\ b \\ c \end{pmatrix} = \begin{pmatrix} u1 \\ u2 \\ u3 \end{pmatrix} \quad \text{Formula 3}$$

$$\begin{pmatrix} x1 & y1 & 1 \\ x2 & y2 & 1 \\ x3 & y3 & 1 \end{pmatrix} \begin{pmatrix} d \\ e \\ f \end{pmatrix} = \begin{pmatrix} v1 \\ v2 \\ v3 \end{pmatrix} \quad \text{Formula 4}$$

Solving these equations makes it possible to calculate the affine coefficients a to f. If four or more feature points have been successfully detected, nearby points are excluded, and the points are normalized using the least-squares method. If three points cannot be found, or the extracted three points are linear in form and two of the three points are nearby, it is determined that the movement amount calculation has failed.

If the movement amount (affine coefficient) calculated from the images in this manner differs greatly from the movement amount based on the rotation angle 507 calculated from the values detected by the gyrosensor in step S410, it is conceivable that a repeating pattern or a moving object is present in the images. In this case, various measures are conceivable, such as calculating the movement amount again under different conditions, assuming the shot has failed and returning the process to the next shooting (step S406), or providing a warning that the starry sky panoramic shooting has failed.

In step S413, the images obtained from the long-exposure shooting in steps S402 and S407 are positioned using the positioning circuit 116d, on the basis of the movement amount (affine coefficient) calculated from the images, and positioned image data 621 is obtained.

In step S414, the image data 620 from the first image and the positioned image data 621 from the second image are combined using the combining circuit 116j to obtain combined image data 622. Note that carrying out processing on the Nth image (where N>2), the positioned image data 621 from the Nth image is combined with the results of the combination carried out thus far, i.e., the combined image data 620 up to the (N−1)th image.

In step S415, if the switch SW2 (126) is depressed, the process returns to the next shooting in step S406, whereas if the switch SW2 (126) is not depressed, the process moves to step S416. In step S416, the image data is compressed according to a generic format such as JPEG using the compression/decompression circuit 116l, and in step S417, the compressed data is saved in the memory 120.

Note that at this time, it is preferable that γ correction be carried out by the gamma correction circuit 116b, and that correction be carried out to make the overall color tone of the image uniform, to make it easier to see dark parts in the combined image. Furthermore, because the image obtained as a result is large, the magnification circuit 116f may change the size of the image to a size designated in advance by the user. Furthermore, it is preferable that a maximum inscribed rectangle or a predetermined region first be cut out by the trimming circuit 116e before being saved.

Although the foregoing describes an example of shooting a plurality of images while moving the image capturing device in the horizontal direction, the same method can be used when moving image capturing device in the vertical direction.

As described thus far, even if the stars, which serve as a subject, have moved between images shot from different directions, a high-quality panoramic combination image can be shot with correct positioning and without increasing the sensitivity.

Second Embodiment

Figure 6A:
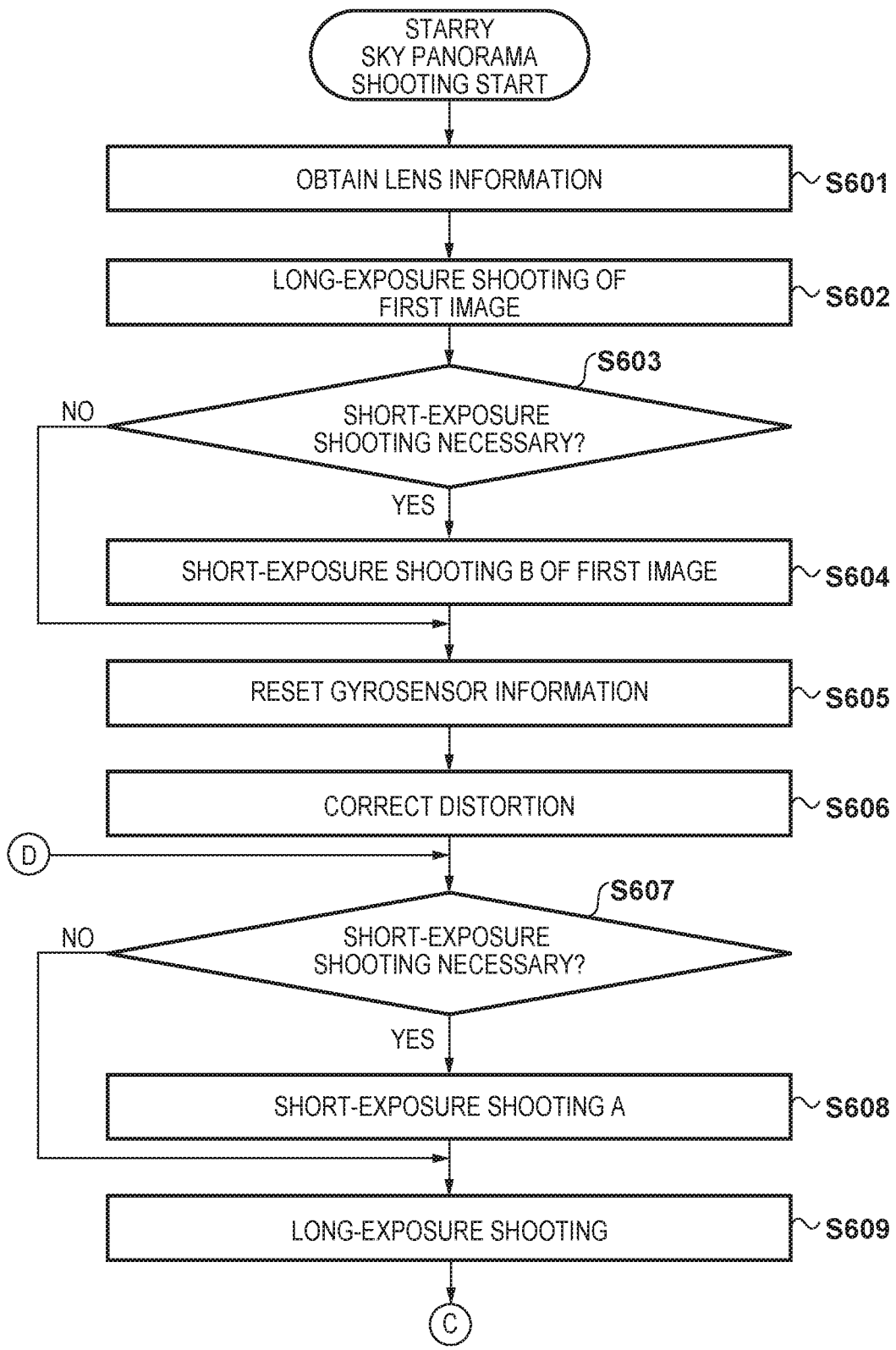
FIGS. 6A and 6B are flowcharts illustrating operations for shooting a panorama of a starry sky, according to a second embodiment.
Figure 6B:
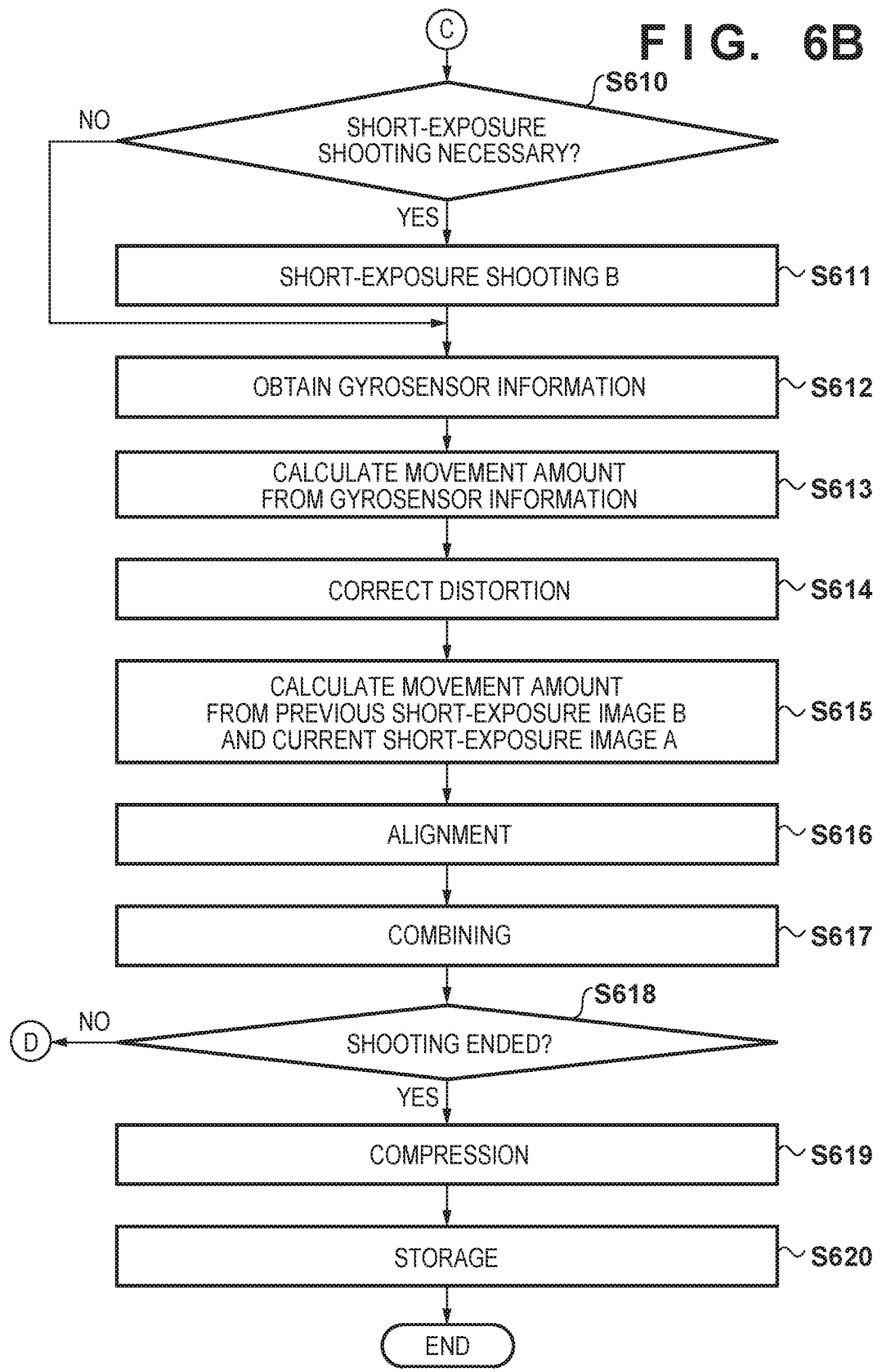

The present embodiment describes an example in which the high-sensitivity short-exposure shooting for calculating the movement amount is unnecessary, depending on the shooting conditions, environment, and the like for the starry sky panoramic shooting. FIGS. 6A and 6B are flowcharts illustrating panoramic shooting operations according to the second embodiment.

The processes of steps S601 to S602 from the start of the starry sky panoramic shooting correspond to the processes of steps S401 to S402 of the first embodiment, the processes of steps S604 to S606, to the processes of steps S403 to S405; the processes of steps S608 to S609, to the processes of steps S406 to S407; and the processes of steps S611 to S620, to the processes of steps S408 to S417. These processes therefore will not be described.

In step S603, it is determined whether or not it is necessary to carry out the high-sensitivity short-exposure shooting B after the long-exposure shooting for the first image (step S602). The determination is carried out as follows, for example. First, the microcomputer 123 obtains the direction of the image capturing device as detected by the azimuth indicator 134, and calculates the amount of movement of the stars between the shots. If it is determined that the stars have not moved, the process of step S605 is carried out without carrying out the high-sensitivity short-exposure shooting B in step S604. The determination to carry out the high-sensitivity short-exposure shooting B may be made using settings such as the accumulation time.

Whether or not it is necessary to carry out the high-sensitivity short-exposure shooting A and B before and after the long-exposure shooting (step S609) for the second and subsequent images is determined in steps S607 and S610, through the same process as that used in step S603. If it is determined that the stars have not moved, the process of steps S609 and S612 are carried out without carrying out the high-sensitivity short-exposure shooting A in step S608 and the high-sensitivity short-exposure shooting B in step S611.

As described thus far, determining the shooting conditions, shooting environment, and the like for the starry sky panoramic shooting makes it possible to omit high-sensitivity short-exposure shooting not necessary for the positioning. This makes it possible to reduce the power consumed for shooting. Although the present embodiment describes a case where the determination is made before all instances of high-sensitivity short-exposure shooting, the configuration may be such that the determination is made only once, if, while the image capturing device is in a standby state, it can be determined that all instances of the high-sensitivity short-exposure shooting are unnecessary.

Third Embodiment

The present embodiment describes, with reference to FIGS. 4A, 4B, 7A, and 7B, an example of displaying a suitable warning to the user when it is conceivable that the positioning will fail in the starry sky panoramic shooting.

Figure 7A:
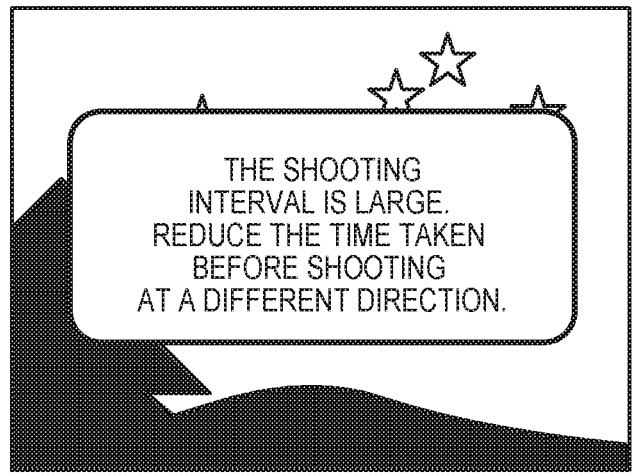
FIGS. 7A and 7B are conceptual diagrams illustrating a warning screen according to a third embodiment.

When the high-sensitivity short-exposure shooting B in 504 and the high-sensitivity short-exposure shooting A in 508 are carried out, the microcomputer 123 obtains and stores the time from the internal clock 132. The microcomputer 123 calculates interval between to the two shooting times. If the interval is greater than or equal to a set time, it is determined that the stars have moved too much, and the warning screen illustrated in FIG. 7A is displayed.

Figure 7B:
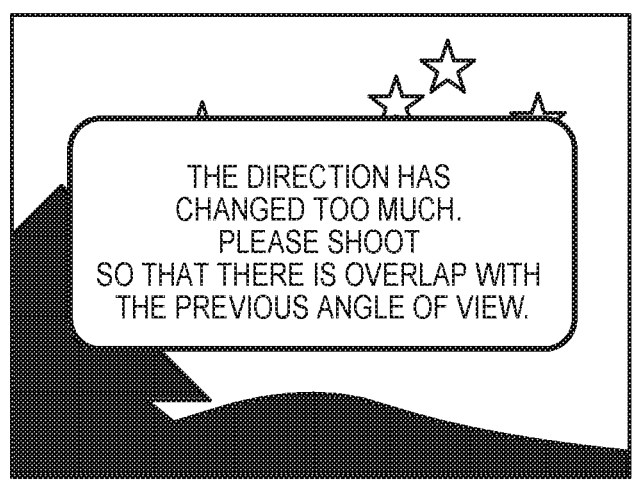
Figure 8A:
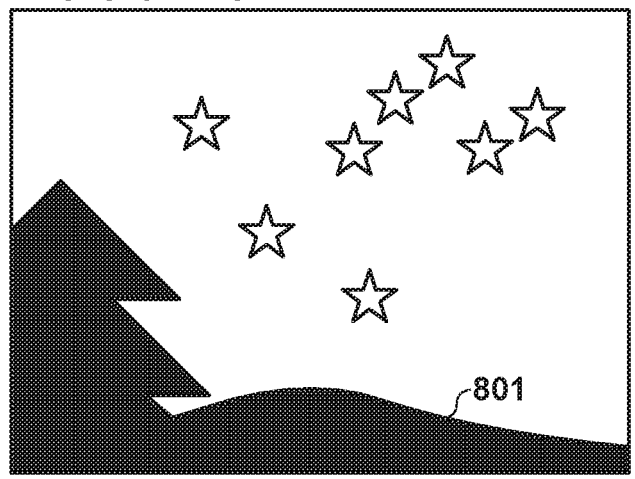
FIGS. 8A to 8C are conceptual diagrams illustrating an issue arising during panoramic combination for a starry sky.
Figure 8B:
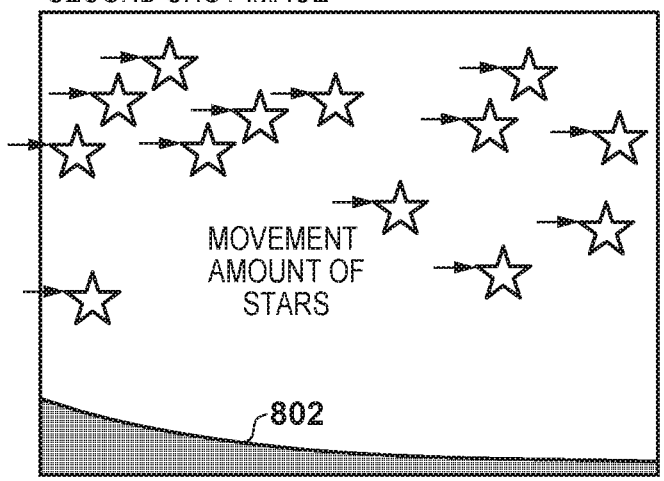
Figure 8C:
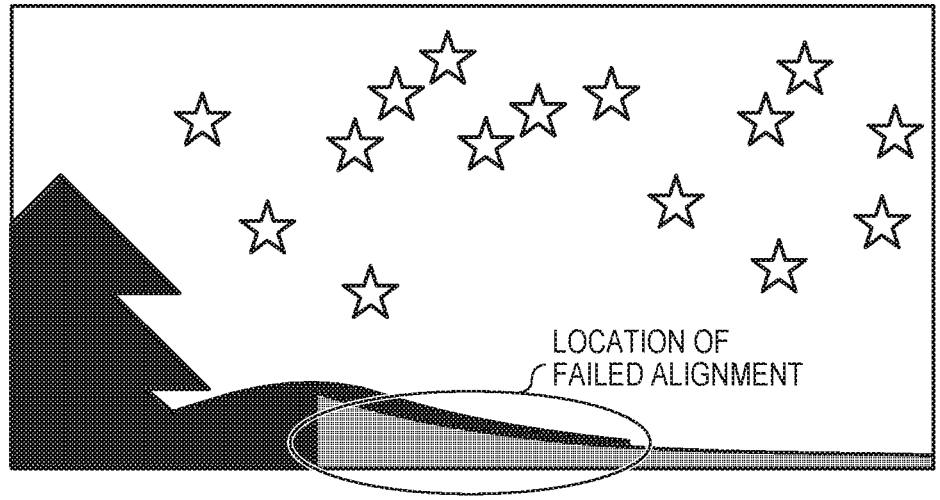

The microcomputer 123 also detects the amount by which the image capturing device has swung from the rotation angle 507, which is the gyrosensor information obtained in step S409. If the amount exceeds a set swing amount, it is determined that positioning cannot be carried out, and the warning screen illustrated in FIG. 7B is displayed.

As described thus far, the convenience can be enhanced for the user by displaying a warning in advance in a situation where positioning is estimated to be impossible in the starry sky panoramic shooting.

Fourth Embodiment

A starry sky panoramic shooting process executed by the microcomputer 123 will be described next using the flowchart in FIG. 9. Although the starry sky panorama shooting mode includes a mode that shoots while changing the direction of the image capturing device 100 in the horizontal direction and a mode that shoots while changing the direction of the image capturing device 100 in the vertical direction, the former will be described here.

When the user selects the starry sky panorama shooting mode by operating the menu button (YES in step S900), shooting preparations are made (step S901).

Here, "shooting preparations" indicate the following specific processes, i.e., supplying power from the power source unit 131 to the image sensor 112, the A/D converter 115, and the like, and resetting those units. Next, the mirror drive circuit 107 is driven to retract the main mirror 105 from the light beam, the shutter drive circuit 111 is driven to open the shutter 110, and the subject image is formed on the image sensor 112 through the shooting lens 101.

The live view display is then started in the liquid crystal monitor 128. In other words, the image signal from the image sensor 112 is converted into a digital signal by the A/D converter 115, the developing circuit 116k of the image signal processing circuit 116 develops the digital signal into image data, and the brightness and luminance of the image are then adjusted by the brightness adjustment circuit 116a and the gamma correction circuit 116b. Furthermore, the image data is converted to an image size suited to the liquid crystal monitor 128 by the magnification circuit 116f, and is then displayed. This is repeated 24 to 60 times per second.

Next, the user adjusts the angle of view while confirming the live view in the liquid crystal monitor 128. When the user then presses the release switch 125 halfway, the release switch 125 turns a SW1 signal on. When the SW1 signal turns on, the microcomputer 123 carries out photometry operations, and the exposure amount calculation circuit 109 calculates the exposure amount. In the present embodiment, the live view is suspended when calculating the exposure amount, and the light reflected by the sub mirror 106 is conducted to a sensor within the exposure amount calculation circuit 109. The exposure amount calculation circuit 109 calculates the optimal exposure amount. Note that the live view may be continued while calculating the exposure amount. In this case, the optimal exposure amount is determined by an exposure amount calculation circuit (not shown) included in the image signal processing circuit 116.

Then, exposure control is carried out on the basis of the calculated exposure amount. Specifically, the aperture value is determined on the basis of the calculated exposure amount, and the aperture value is communicated to the aperture drive circuit 104, which then drives the aperture stop 103 to that aperture value. The sensitivity, accumulation time, and the like of the image sensor 112 are also controlled on the basis of the calculated exposure amount. At this time, the accumulation time is set using a program chart for ensuring an exposure time at which stars will not appear as lines is used in the long-exposure shooting during the starry sky panoramic shooting.

After the exposure control, the AF drive circuit 102 drives the shooting lens 101 to adjust the focus. When this is complete, the user is notified that the starry sky panoramic shooting preparations are complete using a buzzer or the like (not shown), which ends the shooting preparations.

When the shooting preparations in step S901 are complete and the user has received the aforementioned notification, the user points the image capturing device 100 in the direction he/she wishes to start the shooting from, and fully depresses the release switch 125. The release switch 125 turns an SW2 signal on. When the SW1 signal turns on (YES in step S902), the microcomputer 123 transitions to parallel processing for shooting and generating a panoramic image of only the background (step S903). In this process, a panoramic image of only the background is generated in parallel with the shooting for obtaining all the images necessary to generate the panoramic starry sky image. The method for generating a panoramic image of only the background will be described in detail hereinafter.

Figure 4B:
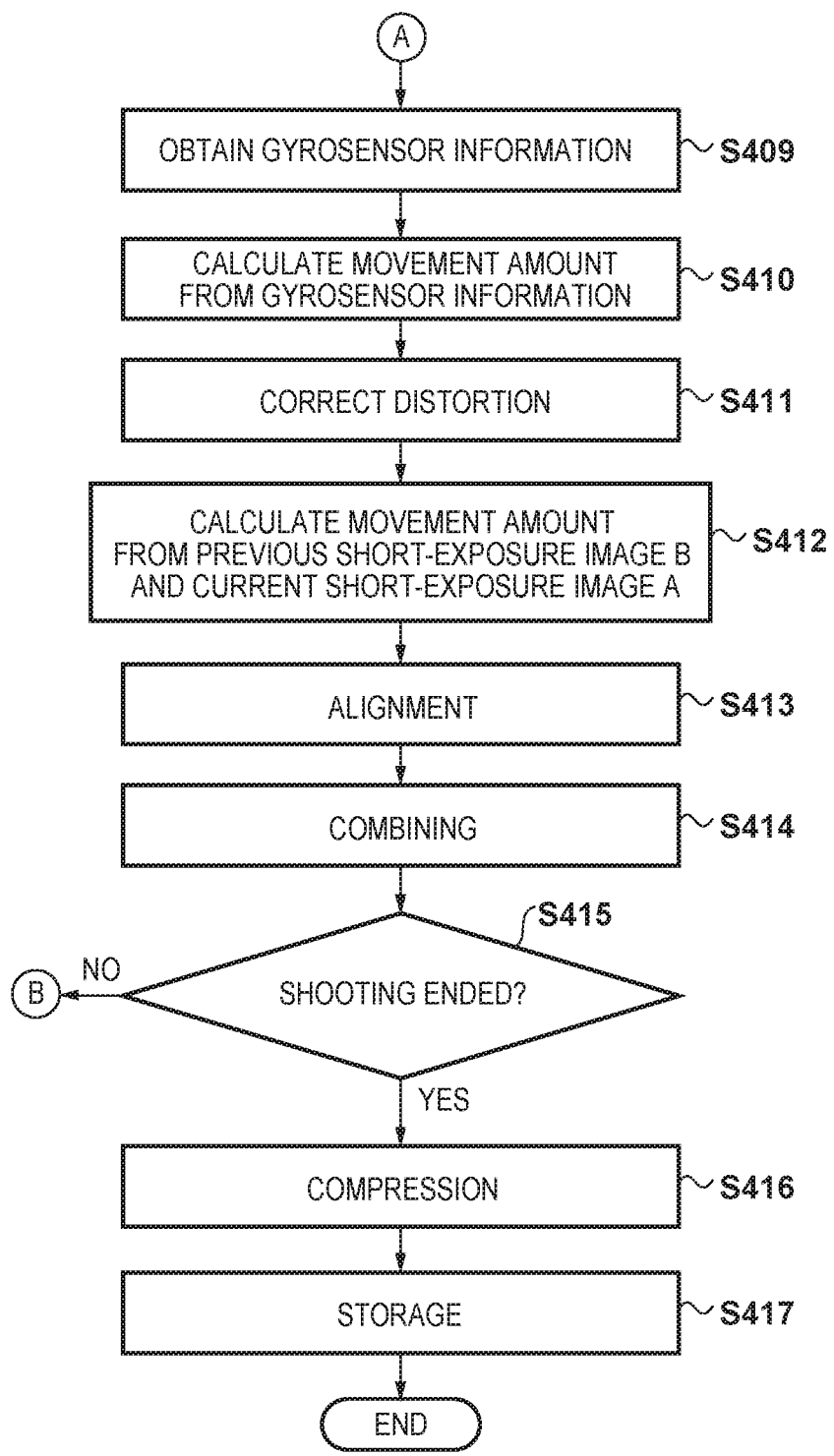
Figure 5A:
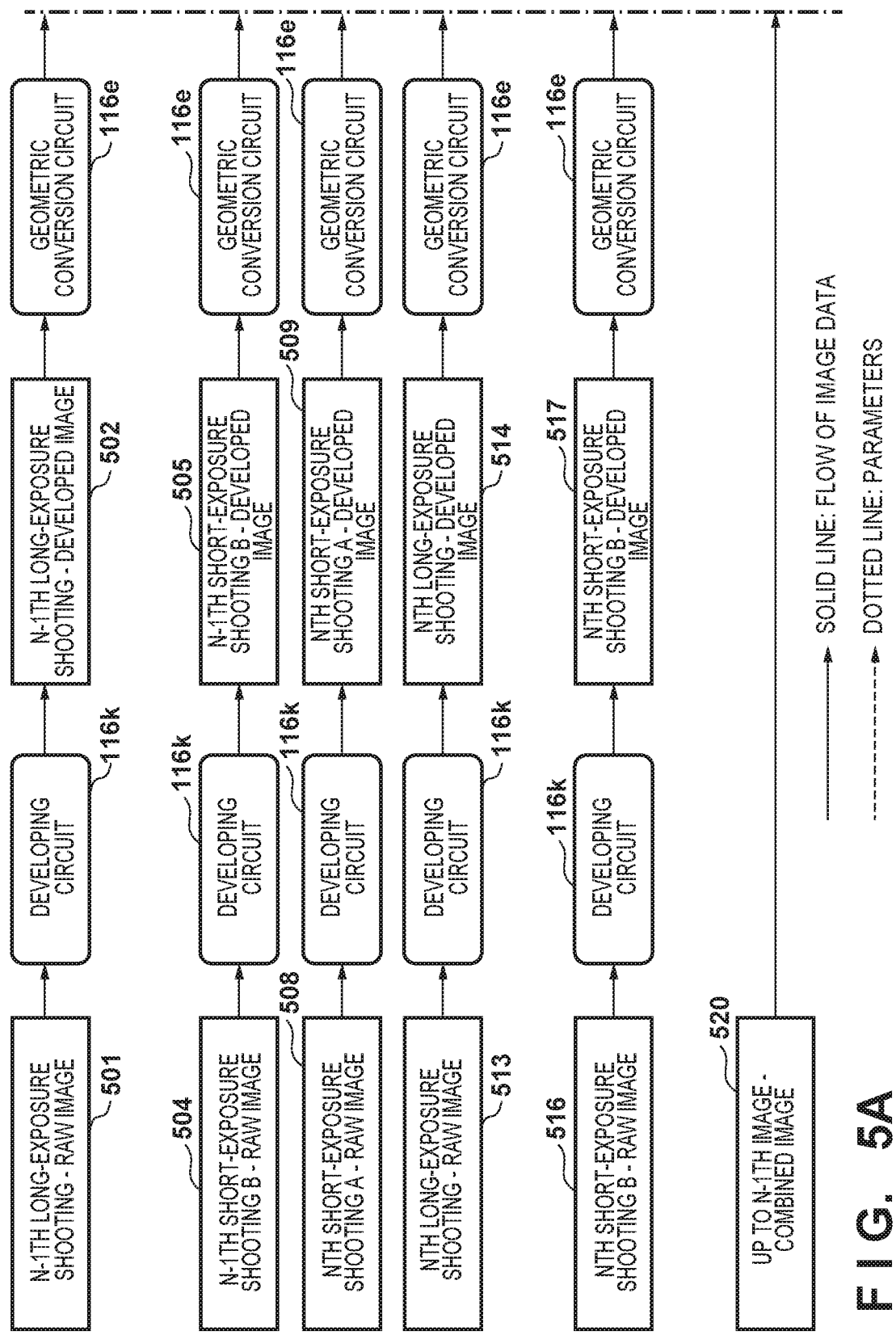
FIGS. 5A and 5B are data flow diagrams illustrating operations according to the first embodiment.
Figure 5B:
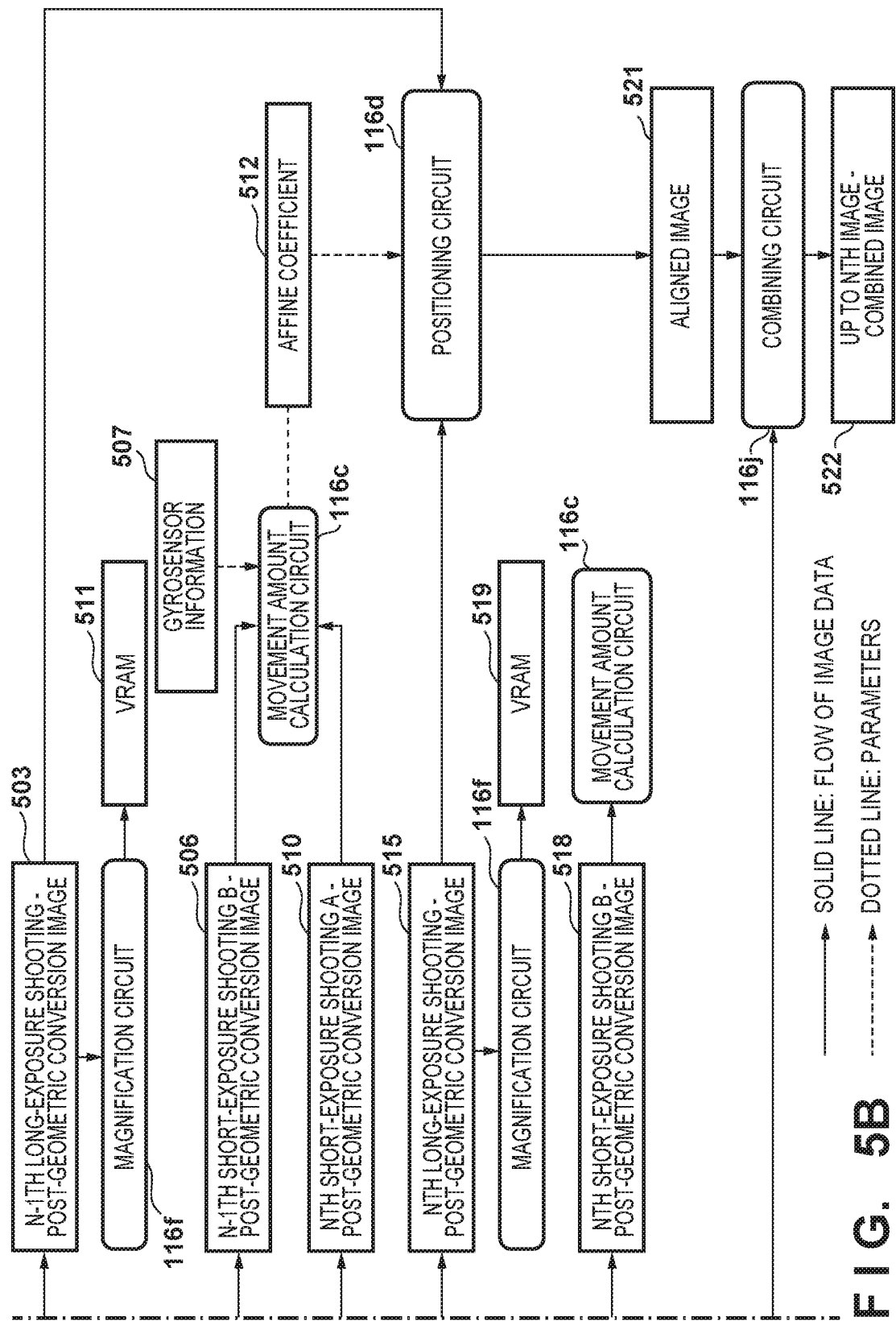

The method for generating a panoramic image of only the background is almost the same as the method illustrated in the flowchart of FIGS. 4A and 4B, but is different in that a comparative dark combination is carried out in step S414, after which the process ends. This will be described next.

In step S414 of FIG. 4B, the combining circuit 116j carries out a comparative dark combination on the positioned image 521 obtained in step S413 and the combined image 520 resulting from the processing up to the N−1th image (a comparative dark combination image, in the present embodiment), and obtains a new comparative dark combination image 622. If N=2, a geometrically-converted image 503 obtained from the long-exposure shooting for the first image is used as the comparative dark combined image 520 resulting from the combination up to the N−1th image. The comparative dark combination process will be described next using the conceptual diagram for an image processing, illustrated in FIG. 10.

Figure 10:
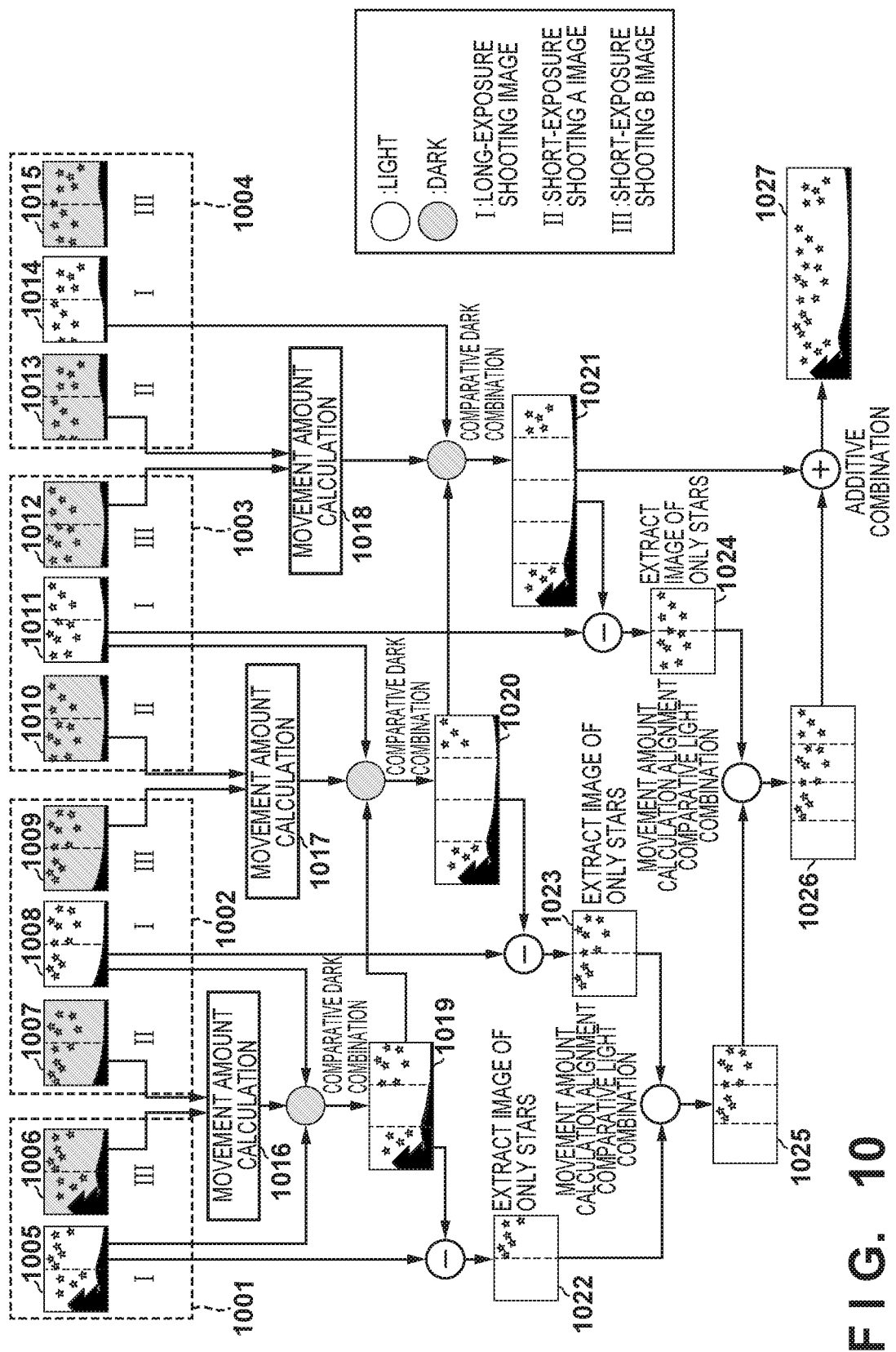
FIG. 10 is a conceptual diagram illustrating the flow of the generation of a panoramic image, according to a fourth embodiment.

As illustrated in FIG. 10, first to fourth geometrically-converted images 1005, 1008, 1011, and 1014 (called simply "long-exposure shooting images" hereinafter), which are obtained from long-exposure shooting at angles of view 1001 to 1004, are obtained while the stars, which are the subject, are moving.

Meanwhile, a geometrically-converted image 1006 (called a "short-exposure shooting B image" (second short-exposure shooting image) hereinafter) is obtained from the short-exposure shooting B for the first image immediately after the long-exposure shooting for the first image. A geometrically-converted image 1007 (called a "short-exposure shooting A image" (first short-exposure shooting image) hereinafter) is obtained from the short-exposure shooting A immediately before the long-exposure shooting for the second image, and a short-exposure shooting B image 1009 is obtained immediately after the long-exposure shooting for the second image. In the same manner, short-exposure shooting A images 1010 and 1013 are obtained immediately before the long-exposure shooting for the third and fourth images, and short-exposure shooting B images 1012 and 1015 are obtained immediately after the long-exposure shooting for the third and fourth images.

First, a movement amount 1016 of the stars, in an overlapping region between the short-exposure shooting B image 1006 of the first image and the short-exposure shooting A image 1007 of the second image, is calculated. Likewise, a movement amount 1017 is calculated using the short-exposure shooting B image 1009 of the second image and the short-exposure shooting A image 1010 of the third image, and a movement amount 1018 is calculated using the short-exposure shooting B image 1012 of the third image and the short-exposure shooting A image 1013 of the fourth image.

The calculated movement amounts 1016, 1017, and 1018 are used when obtaining comparative dark combination images 1019, 1020, and 1021 by carrying out the comparative dark combination process on the long-exposure shooting images 1008, 1011, and 1014. Specifically, the comparative dark combination image 1019 is generated by comparative dark combination, in a state where the long-exposure shooting image 1001 of the first image and the long-exposure shooting image 1008 of the second image have been positioned on the basis of the movement amount 1016. As indicated by the comparative dark combination image 1019, in the overlapping regions of the images subject to the comparative dark combination (the long-exposure shooting images 1005 and 1008, here), the background is stationary and therefore remains, but the stars are moving and therefore do not remain.

Note that when N>2, the comparative dark combination image resulting from the combination up to the N−1th image and the long-exposure shooting image of the Nth image are subject to the comparative dark combination in a state where those images have been positioned on the basis of the movement amount calculated using the short-exposure shooting B image of the N−1th image and the short-exposure shooting A image of the Nth image. A comparative dark combination image that is the result of the combination up to the Nth image is generated as a result. For example, the comparative dark combination image 1020, which is the result of the combination up to the third image, is generated by comparative dark combination, in a state where the comparative dark combination image 919, which is the result of the combination up to the second image, and the long-exposure shooting image 911 of the third image, have been positioned on the basis of the movement amount 917. Repeating the same comparative dark combination makes it possible to generate a panoramic image of only the background, in which the regions of the background area are gradually connected together, as indicated by the comparative dark combination image 1021.

Returning to FIG. 4B, in step S415, the release switch 125 turns the SW2 signal on upon the user fully depressing the release switch 125 during a period from when the short-exposure shooting B of step S408 has ended to when a predetermined amount of time has passed. In this case, it is determined that shooting has not yet ended (NO in step S415), the count N is incremented by 1, and the process is repeated from step S406. On the other hand, if the user has not fully depressed the release switch 125 during the stated period, it is determined that the shooting has ended (YES in step S415), and the process ends. A case where the value of the counter N is n when it is determined, in step S415, that the shooting has ended, will be described below.

According to the processing of the present embodiment as described thus far, by incrementing the counter N from 2 to n, long-exposure shooting is carried out at each angle of view, and short-exposure shooting is carried out before and after each instance of long-exposure shooting. Positioning and comparative dark combination are repeated for each long-exposure shooting image with the movement amount calculated from the obtained short-exposure shooting images. This makes it possible to generate a panoramic image of only the background, in which the regions of the background area are gradually connected together, as indicated by the comparative dark combination image 1021.

Additionally, as indicated by steps S402 and S403, the short-exposure shooting is carried out only after the long-exposure shooting for the first angle of view, i.e., when obtaining the long-exposure shooting image for the first image.

Returning to FIG. 9, when the parallel processing for shooting and generating a panoramic image of only the background of step S903, described in detail with reference to FIGS. 4A and 4B, has ended, the process transitions to a process for generating a panorama of only the stars (step S904).

The process for generating a panoramic image of only the stars in step S904 will be described in detail hereinafter using the flowchart in FIG. 11 and the conceptual diagram of image processing in FIG. 10.

Figure 11:
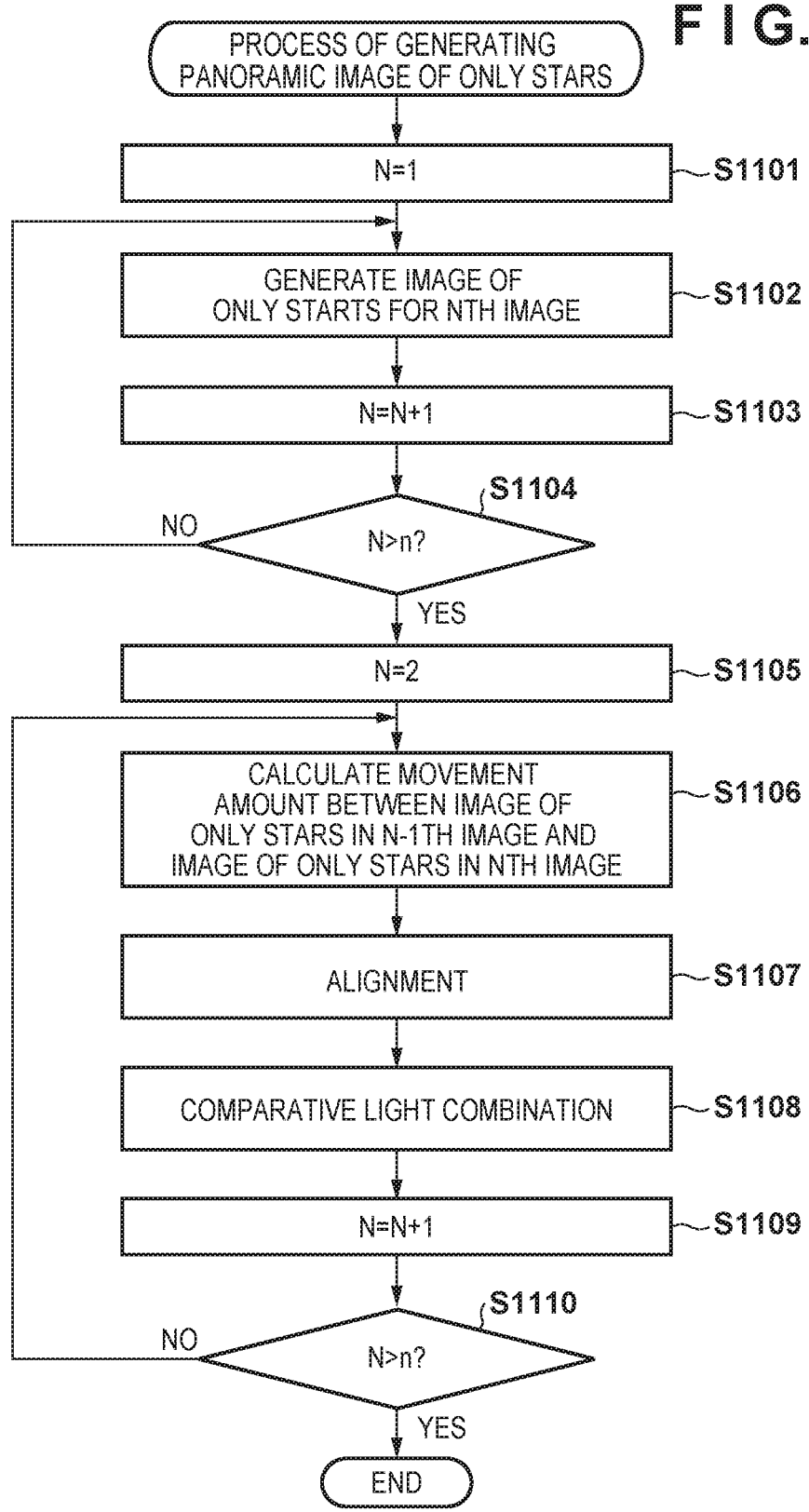
FIG. 11 is a flowchart illustrating operations for shooting a panorama of a starry sky, according to the fourth embodiment.

In FIG. 11, first, the counter N is reset to 1 (step S1101).

Next, a differential image extraction circuit 116*m* carries out differential image extraction on the long-exposure shooting image from the Nth image and the comparative dark combination image that is the result of the combination up to the N+1th image, and a comparative dark combination image for the Nth image is generated (step S1102).

For example, as illustrated in FIG. 10, if N=1, the differential image extraction circuit 116*m* carries out the differential image extraction on the long-exposure shooting image 1005 of the first image and the comparative dark combination image 1019 that is the result of the combination up to the second image, and an image 1022 of only the stars is generated for the first image. The image 1022 of only the stars is an image in which only the stars in the overlapping region of the long-exposure shooting image 1005 remain as a differential image.

The value of the counter N is then incremented (step S1103).

The processing from step S1102 is then repeated until the long-exposure shooting image used in step S1102 reaches N>n, i.e., until the N−1th image is the long-exposure shooting image of the nth image (the last image) (NO in step S1104). As a result, an image 1023 of only the stars for the second image is generated when N=2, and an image 1024 of only the stars for the third image is generated when N=3, as illustrated in FIG. 10.

When the final long-exposure shooting image is determined to have been reached in step S1104, the process moves to step S1105, where the counter N is reset to 2.

Next, the movement amount calculation circuit 116c calculates a movement amount of the stars between the images of only the stars from the N−1th image and the Nth image (a movement amount between images of only the stars) (step S1106). For example, when N=2, the movement amount calculation circuit 116c calculates the movement amount from the images 1022 and 1023 of only the stars, of the first image and the second image, as illustrated in FIG. 10.

Next, the positioning circuit 116d positions the images of only the stars, of the N−1th image and the Nth image, on the basis of the movement amount calculated in step S1106 (step S1107). For example, if N=2, the images 1022 and 1023 of only the stars, of the first image and the second image, are positioned, as illustrated in FIG. 10.

In step S1108, the combining circuit 116j carries out a comparative light combination on a comparative light combined image, which is the result of combining the images of only the stars up to the N−1th image, positioned in step S1107, and the image of only the stars from the Nth image. A comparative light combined image, which is the result of the combination up to the Nth image, is generated as a result. For example, as illustrated in FIG. 10, if N=3, the combining circuit 116j carries out a comparative light combination on a comparative light combined image 1025, which is the result of the combination up to the second image, and the image 1024 of only the stars, from the third image. A comparative light combined image 1026, which is the result of the combination up to the third image, is generated as a result. Note that the image 1022 of only the stars of the first image is used as the comparative light combined image, which is the result of the combination up to the N−1th image, only when N=2.

Next, the value of the counter N is incremented (step S1109), and the processing from step S1106 is then repeated until N>n, i.e., until the N−1th image is the image of only the stars in the nth image (the last image) (NO in step S1110), after which the process ends.

As described above, according to the process of FIG. 11, by incrementing the value of the counter N in order from 2 to n, the positioning and comparative light combination for each movement amount between the images of only the stars is repeated for each image of only stars extracted from the differences between each long-exposure shooting image and the comparative dark combination result. This makes it possible to generate a panoramic image of only the stars, in which the regions of the starry areas are gradually connected together, as indicated by the comparative light combined image 1026.

Figure 12:
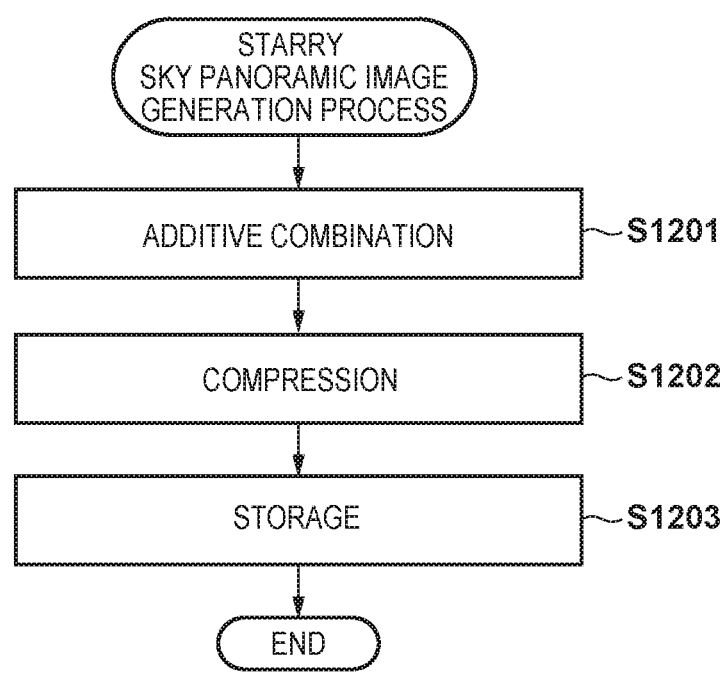
FIG. 12 is a flowchart illustrating operations in a panoramic starry sky image generation process, according to the fourth embodiment.

Returning to FIG. 9, when the panoramic image generation process for only the stars in step S904, described in detail with reference to FIG. 12, is completed, the process transitions to the panoramic starry sky image generation process (step S905).

The panoramic starry sky image generation process of step S905 will be described in detail hereinafter using the conceptual diagram of image processing in FIG. 10 and the flowchart in FIG. 12.

In FIG. 12, first, a panoramic image of only the background (e.g., the comparative dark combination image 1021 in FIG. 10) and a panoramic image of only the stars (e.g., the comparative light combined image 1026 in FIG. 10) are added and combined by the combining circuit 116j (step S1201). The panoramic starry sky image 1027 is generated as a result, as indicated in FIG. 10.

The generated panoramic starry sky image 1027 is compressed into a generic format such as JPEG by the compression/decompression circuit 116l (step S1202) and stored in the memory 120 (step S1203), after which the processing ends. Note that at this time, it is preferable that γ correction be carried out by the gamma correction circuit 116b, and that correction be carried out to make the overall color tone of the image uniform, to make it easier to see dark parts in panoramic starry sky image 1027. Furthermore, because the image obtained as a result is large, the magnification circuit 116f may change the size of the image to a size designated in advance by the user. Further still, it is preferable that a maximum inscribed rectangle or a predetermined region first be cut out by the trimming circuit 116e before being saved.

Returning to FIG. 9, when the panoramic starry sky image generation process of step S905, described in detail with reference to FIG. 12 has ended, the overall starry sky panoramic shooting process ends.

Although the present embodiment describes an example in which the image capturing device 100 is swung in the horizontal direction, the image capturing device 100 may be swung in the vertical direction as well.

As described above, in starry sky panoramic shooting, even if the stars serving as the subject move between instances of shooting at different angles of view, both the background and the stars can be positioned.

Fifth Embodiment

In the present embodiment, in the process of generating a panoramic image of only the stars carried out in step S904 of the starry sky panoramic shooting process illustrated in FIG. 9, an appropriate warning is displayed to the user when the calculation of the movement amount between images of only the starts fails, and replacement means for the comparative dark combination process are carried out. The present embodiment will be described in detail below with reference to FIGS. 13, 14, and 15.

The present embodiment differs from the first embodiment only in terms of part of the panoramic image generation process for only the stars, but the other processing and hardware configurations are the same as in the first embodiment. As such, like configurations and steps are given the same reference numerals, and redundant descriptions will be omitted.

Figure 13:
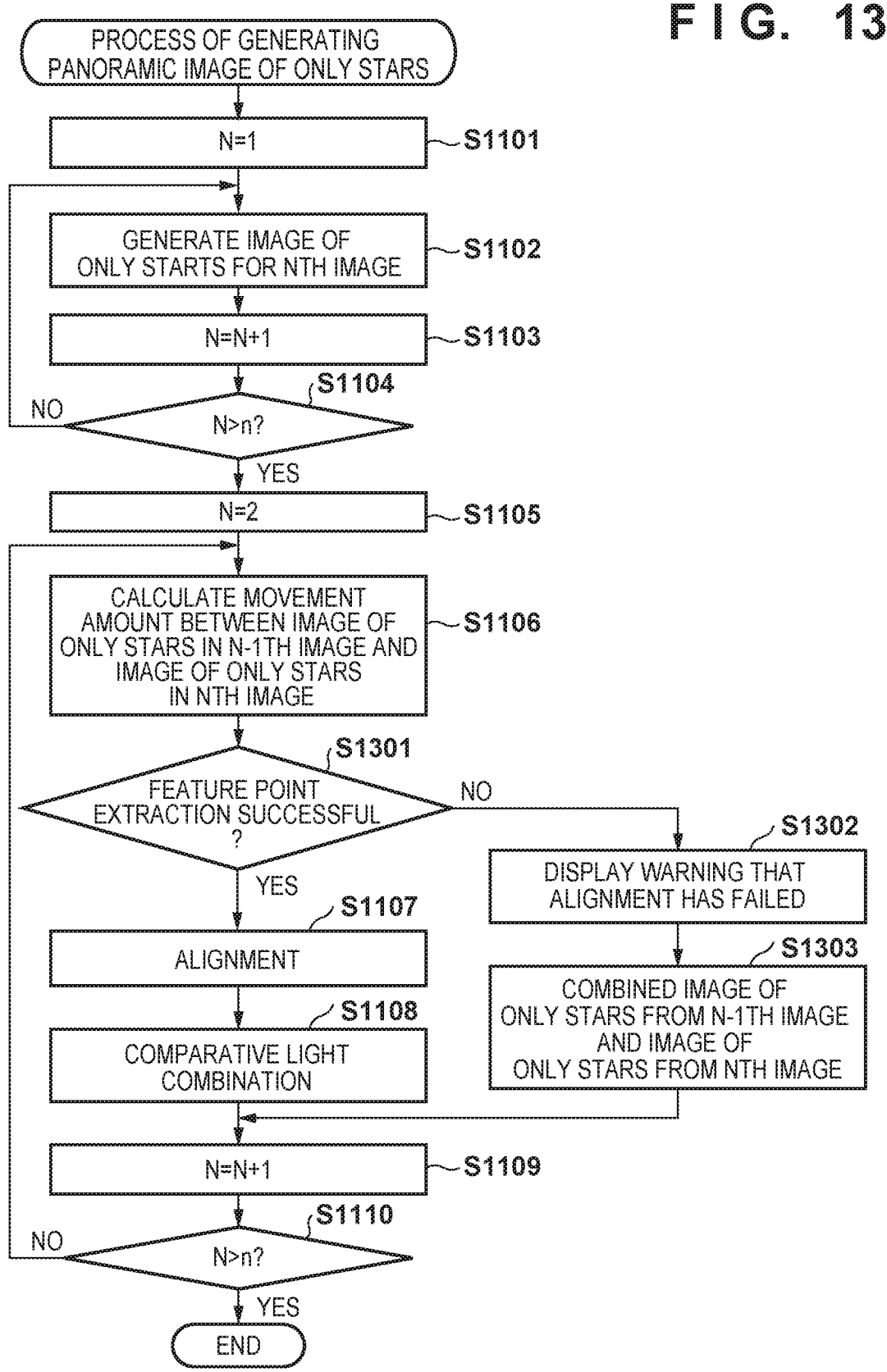
FIG. 13 is a flowchart illustrating operations in a panoramic starry sky image generation process, according to a fifth embodiment.

In FIG. 13, when the processes of steps S1101 to S1106 of FIG. 11 have been performed, the process moves to step S1101.

Figure 14:
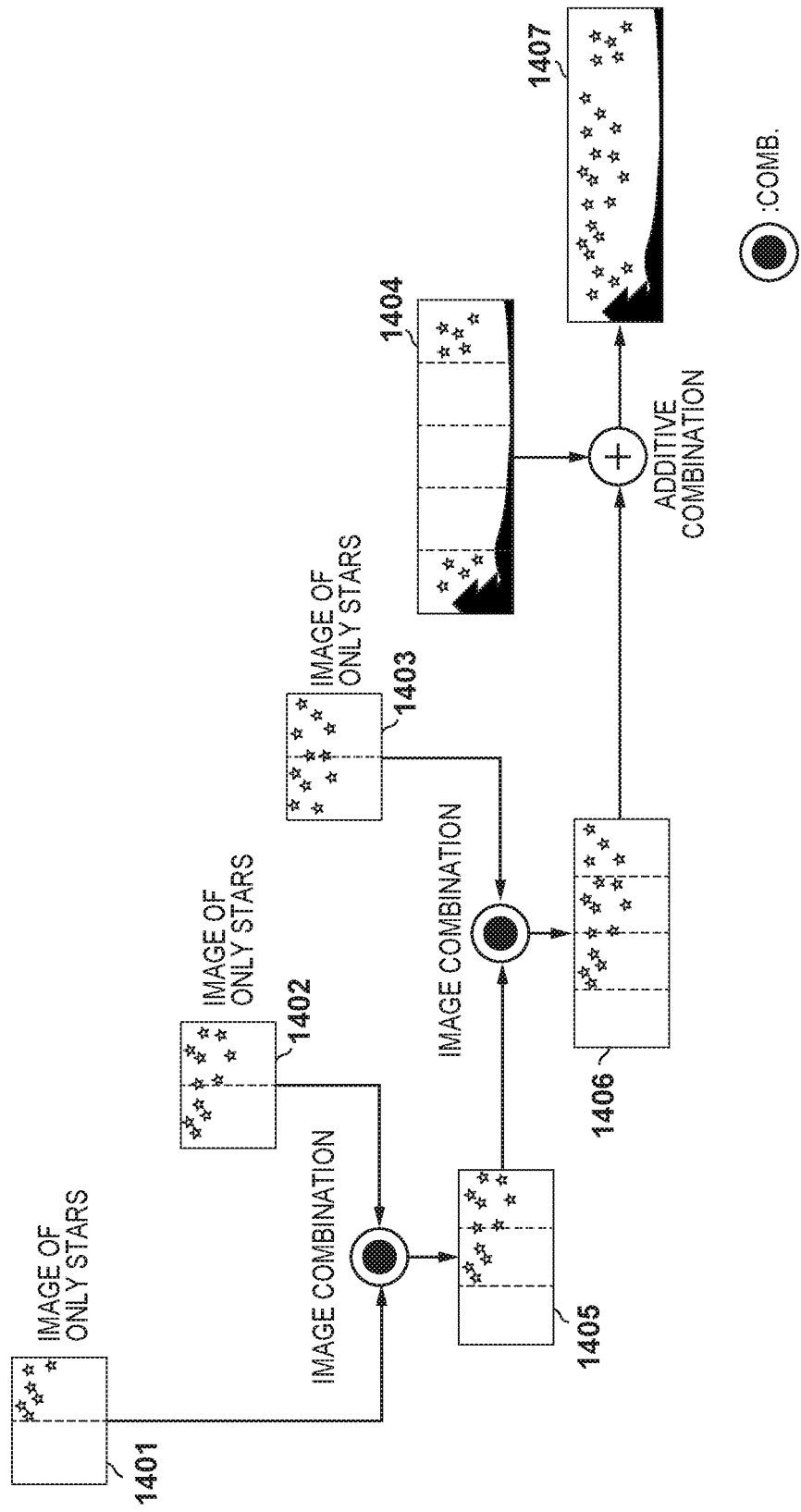
FIG. 14 is a conceptual diagram illustrating the flow of the generation of a panoramic image, according to the fifth embodiment.

In step S1101, it is determined whether the movement amount between the images of only the stars has been successfully calculated, and specifically, whether or not feature points have been successfully extracted in the overlapping region in the images 1401 and 1402 of only the stars, for M−1th and Mth images indicated in FIG. 14 (where M is an integer equal to 2≤M≤n). If the result of this determination indicates success, the processing from step S1107 in FIG. 11 is carried out, after which this process ends.

Figure 15:
FIG. 15 is a conceptual diagram illustrating a warning screen according to the fifth embodiment.

On the other hand, if the feature point extraction has failed (NO in step S1101), a warning is displayed for the user, indicating that the positioning of the images of only the stars has failed (step S1311). The method for making this warning display is not particularly limited, but for example, the notification screen shown in FIG. 15 is displayed in the liquid crystal monitor 128.

Next, the combining circuit 116j generates a combined image 1405 the images 1401 and 1402 of only the stars, from the M−1th and Mth images (step S1312). At this time, in the present embodiment, the image 1401 of only the stars, from the M−1th image, is employed as the image of the overlapping region between the images 1401 and 1402 of only the stars, but the image 1402 of only the stars, from the Mth image, may be employed instead. Also, because luminance differences arise easily at the boundary areas of such a combined image 1405, a filter may be applied to the boundary areas to add blur or the like.

Thereafter, the processing from step S1109 and on is carried out, and the overall process ends.

As described above, when the feature point extraction fails when calculating the movement amount between the images of only the stars, a process for combining both of the images is carried out. This makes it possible to prevent a situation in which the panoramic starry sky image cannot be generated despite the user taking multiple shots over a period of time in the parallel processing for shooting and generating a panoramic image of only the background, illustrated in FIGS. 6A and 6B.

On the other hand, when carrying out such a combining process, it is conceivable that the positioning of the images of only the stars will fail in the starry sky panoramic shooting. Accordingly, a panoramic starry sky image is generated while displaying a warning in advance immediately before performing the combining process, which makes it possible to improve the convenience for the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-153205, filed Aug. 16, 2018, and No. 2018-167870, filed Sep. 7, 2018 which are hereby incorporated by reference herein in their entirety.

What is claimed is:

1. An image capturing device capable of generating a single combined image by combining a plurality of images, each image being from a different image capturing region, and each image having a region at least partially shared by another image capturing region, the device comprising:
   an image sensor configured to capture a subject image, the image sensor:
   capturing a first image in a first image capturing region;
   capturing a second image in the first image capturing region at a shorter exposure time than that of the first image, after capturing the first image, the second image being captured in the same image capturing region as the first image;
   capturing a third image in a second image capturing region at a shorter exposure time than that of the first image, after capturing the second image; and
   capturing a fourth image in the second image capturing region at a longer exposure time than those of the second and third images, after capturing the third image, the fourth image being captured in the same image capturing region as the third image; and
   the device further comprising:
   at least one processor or circuit configured to function as:
   a combining unit configured to carry out alignment processing between the images using the second image and the third image, and combine the first image and the fourth image on the basis of a result of the alignment processing,
   a second determination unit configured to determine whether or not the first image and the fourth image can be aligned, and
   warning unit configured to issue a warning when the second determination unit determines that the first image and the fourth image cannot be aligned,
   wherein the subject of the capturing is a starry sky, and the first image and the fourth image are images shot at long exposures for shooting the starry sky.

2. The image capturing device according to claim 1, wherein the second image and the third image are images shot with the sensitivity of the image sensor having been increased more than the first image and the fourth image.

3. The image capturing device according to claim 1, wherein the at least one processor or circuit is configured to further function as:
   a first determination unit configured to determine whether or not it is necessary to capture the second image,
   wherein when the first determination unit determines that it is not necessary to capture the second image, the image sensor omits the capturing of the second image.

4. The image capturing device according to claim 1, wherein the at least one processor or circuit is configured to further function as:
   a setting unit configured to transition to a mode for shooting a starry sky,
   wherein the combining unit carries out the combining in the mode for shooting the starry sky.

5. The image capturing device according to claim 1, wherein the second determination unit determines that the first image and the fourth image cannot be aligned when a movement amount of the subject between the second image and the third image is greater than a predetermined amount.

6. An image capturing device capable of generating a single combined image by combining a plurality of images, each image being from a different image capturing region, and each image having a region at least partially shared by another image capturing region, the device comprising:
an image sensor configured to capture a subject image, the image sensor:
capturing a first image in a first image capturing region;
capturing a second image in the first image capturing region at a shorter exposure time than that of the first image, after capturing the first image, the second image being captured in the same image capturing region as the first image;
capturing a third image in a second image capturing region at a shorter exposure time than that of the first image, after capturing the second image; and
capturing a fourth image in the second image capturing region at a longer exposure time than those of the second and third images, after capturing the third image, the fourth image being captured in the same image capturing region as the third image; and
the device further comprising:
at least one processor or circuit configured to function as:
a combining unit configured to carry out alignment processing between the images using the second image and the third image, and combine the first image and the fourth image on the basis of a result of the alignment processing,
a second determination unit configured to determine whether or not the first image and the fourth image can be aligned, and
a time measurement unit configured to measure the amount of time that has passed between the capturing of the second image and the capturing of the third image,
wherein the subject of the capturing is a starry sky, and the first image and the fourth image are images shot at long exposures for shooting the starry sky, and
wherein the second determination unit determines that the first image and the fourth image cannot be aligned when the amount of time that has passed is greater than a predetermined amount of time.

7. An image processing device capable of generating a single combined image by combining a plurality of images, each image being from a different image capturing region, and each image having a region at least partially shared by another image capturing region, the device comprising:
at least one processor or circuit configured to function as:
an obtainment unit configured to obtain a first image captured in a first image capturing region, a second image captured in the first image capturing region at a shorter exposure time than that of the first image after the first image has been captured, a third image captured in a second image capturing region at a shorter exposure time than that of the first image after the second image has been captured, and a fourth image captured in the second image capturing region at a longer exposure time than those of the second and third images after the third image has been captured, the images being captured by image sensor; and
a combining unit configured to carry out alignment processing between the images using the second image and the third image, and combine the first image and the fourth image on the basis of a result of the alignment processing,
a determination unit configured to determine whether or not the first image and the fourth image can be aligned, and
a warning unit configured to issue a warning when the determination unit determines that the first image and the fourth image cannot be aligned,
wherein the subject of the capturing is a starry sky, and the first image and the fourth image are images shot at long exposures for shooting the starry sky, and
wherein the second image is captured in the same image capturing region as the first image, and the fourth image is captured in the same image capturing region as the third image.

8. The image processing device according to claim 7, wherein the second image and the third image are images shot with the sensitivity of the image sensor having been increased more than the first image and the fourth image.

9. The image processing device according to claim 7, wherein the at least one processor or circuit is configured to further function as:
a calculation unit configured to calculate a movement amount of the subject between the second image and the third image,
wherein the determination unit determines that the first image and the fourth image cannot be aligned when the movement amount of the subject is greater than a predetermined amount.

10. An image processing device capable of generating a single combined image by combining a plurality of images, each image being from a different image capturing region, and each image having a region at least partially shared by another image capturing region, the device comprising:
at least one processor or circuit configured to function as:
an obtainment unit configured to obtain a first image captured in a first image capturing region, a second image captured in the first image capturing region at a shorter exposure time than that of the first image after the first image has been captured, a third image captured in a second image capturing region at a shorter exposure time than that of the first image after the second image has been captured, and a fourth image captured in the second image capturing region at a longer exposure time than those of the second and third images after the third image has been captured, the images being captured by image sensor; and
a combining unit configured to carry out alignment processing between the images using the second image and the third image, and combine the first image and the fourth image on the basis of a result of the alignment processing,
a determination unit configured to determine whether or not the first image and the fourth image can be aligned, and
a time measurement unit configured to measure the amount of time that has passed between the capturing of the second image and the capturing of the third image,
wherein the subject of the capturing is a starry sky, and the first image and the fourth image are images shot at long exposures for shooting the starry sky, wherein the second image is captured in the same image capturing region as the first image, and the fourth image is captured in the same image capturing region as the third image, and wherein the determination unit determines that the first image and the fourth image cannot be aligned when the amount of time that has passed is greater than a predetermined amount of time.

11. A method of controlling an image capturing device capable of generating a single combined image by combining a plurality of images, each image being from a different image capturing region, and each image having a region at least partially shared by another image capturing region, the method comprising:

capturing a first image in a first image capturing region;

capturing a second image in the first image capturing region at a shorter exposure time than that of the first image, after capturing the first image, the second image being captured in the same image capturing region as the first image;

capturing a third image in a second image capturing region at a shorter exposure time than that of the first image, after capturing the second image;

capturing a fourth image in the second image capturing region at a longer exposure time than those of the second and third images, after capturing the third image, the fourth image being captured in the same image capturing region as the third image;

carrying out alignment processing between the images using the second image and the third image, and combining the first image and the fourth image on the basis of a result of the alignment processing, determining whether or not the first image and the fourth image can be aligned, and issuing a warning when the determining determines that the first image and the fourth image cannot be aligned, wherein the subject of the capturing is a starry sky, and the first image and the fourth image are images shot at long exposures for shooting the starry sky.

12. A method of controlling an image processing device capable of generating a single combined image by combining a plurality of images, each image being from a different image capturing region, and each image having a region at least partially shared by another image capturing region, the method comprising:

obtaining a first image captured in a first image capturing region, a second image captured in the first image capturing region at a shorter exposure time than that of the first image after the first image has been captured, a third image captured in a second image capturing region at a shorter exposure time than that of the first image after the second image has been captured, and a fourth image captured in the second image capturing region at a longer exposure time than those of the second and third images after the third image has been captured, the images being captured by image sensor; and carrying out alignment processing between the images using the second image and the third image, and combining the first image and the fourth image on the basis of a result of the alignment processing, determining whether or not the first image and the fourth image can be aligned, and issuing a warning when the determining determines that the first image and the fourth image cannot be aligned, wherein the subject of the capturing is a starry sky, and the first image and the fourth image are images shot at long exposures for shooting the starry sky, and wherein the second image is captured in the same image capturing region as the first image, and the fourth image is captured in the same image capturing region as the third image.

13. A non-transitory computer-readable storage medium storing a program for causing a computer to execute the steps of a method of controlling an image capturing device capable of generating a single combined image by combining a plurality of images, each image being from a different image capturing region, and each image having a region at least partially shared by another image capturing region, the method comprising:

capturing a first image in a first image capturing region;

capturing a second image in the first image capturing region at a shorter exposure time than that of the first image, after capturing the first image, the second image being captured in the same image capturing region as the first image;

capturing a third image in a second image capturing region at a shorter exposure time than that of the first image, after capturing the second image;

capturing a fourth image in the second image capturing region at a longer exposure time than those of the second and third images, after capturing the third image, the fourth image being captured in the same image capturing region as the third image;

carrying out alignment processing between the images using the second image and the third image, and combining the first image and the fourth image on the basis of a result of the alignment processing, determining whether or not the first image and the fourth image can be aligned, and issuing a warning when the determining determines that the first image and the fourth image cannot be aligned, wherein the subject of the capturing is a starry sky, and the first image and the fourth image are images shot at long exposures for shooting the starry sky.

14. A non-transitory computer-readable storage medium storing a program for causing a computer to execute the steps of a method of controlling an image processing device capable of generating a single combined image by combining a plurality of images, each image being from a different image capturing region, and each image having a region at least partially shared by another image capturing region, the method comprising:

obtaining a first image captured in a first image capturing region, a second image captured in the first image capturing region at a shorter exposure time than that of the first image after the first image has been captured, a third image captured in a second image capturing region at a shorter exposure time than that of the first image after the second image has been captured, and a fourth image captured in the second image capturing region at a longer exposure time than those of the second and third images after the third image has been captured, the images being captured by image sensor; and carrying out alignment processing between the images using the second image and the third image, and combining the first image and the fourth image on the basis of a result of the alignment processing, determining whether or not the first image and the fourth image can be aligned, and issuing a warning when the determining determines that the first image and the fourth image cannot be aligned, wherein the subject of the capturing is a starry sky, and the first image and the fourth image are images shot at long exposures for shooting the starry sky, and wherein the second image is captured in the same image capturing region as the first image, and the fourth image is captured in the same image capturing region as the third image.

15. The image capturing device according to claim 1, wherein the first image capturing region and the second image capturing region are different image capturing regions.

16. A method of controlling an image capturing device capable of generating a single combined image by combining a plurality of images, each image being from a different image capturing region, and each image having a region at least partially shared by another image capturing region, the method comprising:

capturing a first image in a first image capturing region;

capturing a second image in the first image capturing region at a shorter exposure time than that of the first image, after capturing the first image, the second image being captured in the same image capturing region as the first image;

capturing a third image in a second image capturing region at a shorter exposure time than that of the first image, after capturing the second image;

capturing a fourth image in the second image capturing region at a longer exposure time than those of the second and third images, after capturing the third image, the fourth image being captured in the same image capturing region as the third image;

carrying out alignment processing between the images using the second image and the third image, and combining the first image and the fourth image on the basis of a result of the alignment processing, determining whether or not the first image and the fourth image can be aligned, and measuring the amount of time that has passed between the capturing of the second image and the capturing of the third image, wherein the subject of the capturing is a starry sky, and the first image and the fourth image are images shot at long exposures for shooting the starry sky, and wherein the determining determines that the first image and the fourth image cannot be aligned when the amount of time that has passed is greater than a predetermined amount of time.

17. A method of controlling an image processing device capable of generating a single combined image by combining a plurality of images, each image being from a different image capturing region, and each image having a region at least partially shared by another image capturing region, the method comprising:

obtaining a first image captured in a first image capturing region, a second image captured in the first image capturing region at a shorter exposure time than that of the first image after the first image has been captured, a third image captured in a second image capturing region at a shorter exposure time than that of the first image after the second image has been captured, and a fourth image captured in the second image capturing region at a longer exposure time than those of the second and third images after the third image has been captured, the images being captured by image sensor; and carrying out alignment processing between the images using the second image and the third image, and combining the first image and the fourth image on the basis of a result of the alignment processing, determining whether or not the first image and the fourth image can be aligned, and measuring the amount of time that has passed between the capturing of the second image and the capturing of the third image, wherein the subject of the capturing is a starry sky, and the first image and the fourth image are images shot at long exposures for shooting the starry sky, wherein the second image is captured in the same image capturing region as the first image, and the fourth image is captured in the same image capturing region as the third image, and wherein the determining determines that the first image and the fourth image cannot be aligned when the amount of time that has passed is greater than a predetermined amount of time.

18. A non-transitory computer-readable storage medium storing a program for causing a computer to execute the steps of a method of controlling an image capturing device capable of generating a single combined image by combining a plurality of images, each image being from a different image capturing region, and each image having a region at least partially shared by another image capturing region, the method comprising:

capturing a first image in a first image capturing region;

capturing a second image in the first image capturing region at a shorter exposure time than that of the first image, after capturing the first image, the second image being captured in the same image capturing region as the first image;

capturing a third image in a second image capturing region at a shorter exposure time than that of the first image, after capturing the second image;

capturing a fourth image in the second image capturing region at a longer exposure time than those of the second and third images, after capturing the third image, the fourth image being captured in the same image capturing region as the third image;

carrying out alignment processing between the images using the second image and the third image, and combining the first image and the fourth image on the basis of a result of the alignment processing, determining whether or not the first image and the fourth image can be aligned, and measuring the amount of time that has passed between the capturing of the second image and the capturing of the third image, wherein the subject of the capturing is a starry sky, and the first image and the fourth image are images shot at long exposures for shooting the starry sky, and wherein the determining determines that the first image and the fourth image cannot be aligned when the amount of time that has passed is greater than a predetermined amount of time.

19. A non-transitory computer-readable storage medium storing a program for causing a computer to execute the steps of a method of controlling an image processing device capable of generating a single combined image by combining a plurality of images, each image being from a different image capturing region, and each image having a region at least partially shared by another image capturing region, the method comprising:

obtaining a first image captured in a first image capturing region, a second image captured in the first image capturing region at a shorter exposure time than that of the first image after the first image has been captured, a third image captured in a second image capturing region at a shorter exposure time than that of the first image after the second image has been captured, and a fourth image captured in the second image capturing region at a longer exposure time than those of the second and third images after the third image has been captured, the images being captured by image sensor; and carrying out alignment processing between the images using the second image and the third image, and combining the first image and the fourth image on the basis of a result of the alignment processing, determining whether or not the first image and the fourth image can be aligned, and measuring the amount of time that has passed between the capturing of the second image and the capturing of the third image, wherein the subject of the capturing is a starry sky, and the first image and the fourth image are images shot at long exposures for shooting the starry sky, wherein the second image is captured in the same image capturing region as the first image, and the fourth image is captured in the same image capturing region as the third image, and wherein the determining determines that the first image and the fourth image cannot be aligned when the amount of time that has passed is greater than a predetermined amount of time.

* * * * *